(12) United States Patent
Matsui

(10) Patent No.: US 11,036,486 B2
(45) Date of Patent: Jun. 15, 2021

(54) COMMUNICATION APPARATUS FOR WIRELESSLY COMMUNICATING WITH ANOTHER APPARATUS, INFORMATION PROCESSING METHOD, AND PROGRAM

(71) Applicant: CANON KABUSHIKI KAISHA, Tokyo (JP)

(72) Inventor: Takashi Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 16/034,679

(22) Filed: Jul. 13, 2018

(65) Prior Publication Data
US 2019/0026096 A1 Jan. 24, 2019

(30) Foreign Application Priority Data
Jul. 19, 2017 (JP) .............................. JP2017-140122

(51) Int. Cl.
*G06F 8/65* (2018.01)
*H04L 29/08* (2006.01)
*G06F 8/654* (2018.01)

(52) U.S. Cl.
CPC ................ *G06F 8/65* (2013.01); *G06F 8/654* (2018.02); *H04L 67/34* (2013.01)

(58) Field of Classification Search
CPC ............. G06F 8/65; G06F 8/654; H04L 67/34
USPC ....................................................... 717/172
See application file for complete search history.

(56) References Cited

U.S. PATENT DOCUMENTS

| 7,293,169 | B1 * | 11/2007 | Righi ........................ G06F 8/65 713/2 |
| 8,409,009 | B2 * | 4/2013 | Motyl .................... G07F 17/323 463/20 |
| 9,942,849 | B1 * | 4/2018 | Hariharan ......... H04W 52/0229 |
| 2009/0305687 | A1 * | 12/2009 | Baldan .................... G06F 21/54 455/419 |
| 2010/0169709 | A1 * | 7/2010 | Chiu ................... G06F 11/1433 714/16 |
| 2011/0154305 | A1 * | 6/2011 | LeRoux .................... G06F 8/71 717/140 |
| 2011/0239208 | A1 * | 9/2011 | Jung ........................ G06F 8/65 717/170 |

(Continued)

FOREIGN PATENT DOCUMENTS

JP        2012-243247 A    12/2012

*Primary Examiner* — Chat C Do
*Assistant Examiner* — Bradford F Wheaton
(74) *Attorney, Agent, or Firm* — Canon U.S.A., Inc., IP Division

(57) ABSTRACT

A communication apparatus includes a first communication unit that communicates with a terminal apparatus using a first communication method, a second communication unit that communicates with a server apparatus using a second communication method different from the first communication method, a reception unit that controls receiving update information from the server apparatus in a case where the communication apparatus can communicate with the server apparatus via the second communication unit, an update unit that performs an update process for updating the communication apparatus using the update information, and a progress management unit that controls transmitting a progress status of a process regarding the update information to the terminal apparatus.

26 Claims, 14 Drawing Sheets

(56) References Cited

U.S. PATENT DOCUMENTS

| | | | |
|---|---|---|---|
| 2011/0314462 A1* | 12/2011 | Clark | G06F 8/65 |
| | | | 717/169 |
| 2013/0109323 A1* | 5/2013 | Ruutu | H04B 5/0031 |
| | | | 455/68 |
| 2014/0282480 A1* | 9/2014 | Matthew | G06F 8/60 |
| | | | 717/172 |
| 2015/0378707 A1* | 12/2015 | Park | G06F 3/04817 |
| | | | 717/174 |
| 2016/0257370 A1* | 9/2016 | Hashimoto | B62M 25/08 |
| 2017/0171295 A1* | 6/2017 | Sung | H04L 67/06 |

* cited by examiner

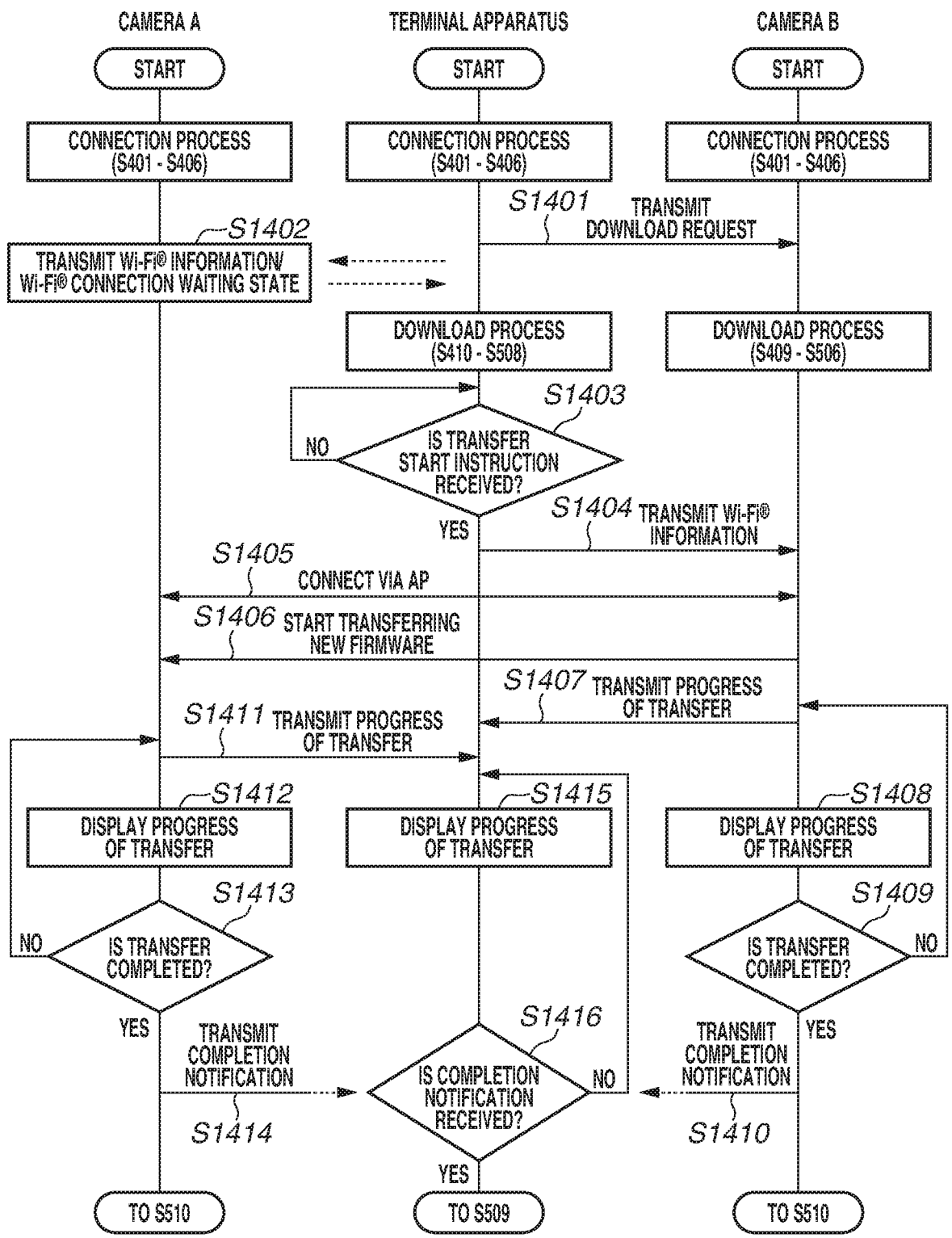

COMMUNICATION APPARATUS FOR WIRELESSLY COMMUNICATING WITH ANOTHER APPARATUS, INFORMATION PROCESSING METHOD, AND PROGRAM

BACKGROUND

Field

The present disclosure relates to a communication apparatus for wirelessly communicating with another apparatus, an information processing method, and a program.

Description of the Related Art

In some instances, to update firmware of a general electronic device, a user has to download the newest firmware from the Internet. At that time, the user needs to perform an operation for downloading the firmware through a menu screen of the device. In, for example, a digital camera and the like, it is necessary to temporarily save the firmware in a recording medium of a personal computer (PC) and then install the firmware on the digital camera, which is a cumbersome procedure. In recent years, mobile terminal apparatuses have been widely used, and the firmware can be easily downloaded from a server on the Internet. Thus, it is easier to update the firmware than before by utilizing a terminal apparatus. Japanese Patent Application Laid-Open No. 2012-243247 discusses a technique for downloading firmware from a server on a network to a terminal apparatus and updating a video device via a predetermined cable for a wired connection.

In a case where a user operates a terminal apparatus to update the firmware of a communication apparatus such as a camera, the user cannot check, on the terminal apparatus, the progress status of an update of the firmware in the communication apparatus.

SUMMARY

According to an aspect of the present disclosure, a communication apparatus includes a first communication unit configured to communicate with a terminal apparatus using a first communication method, a second communication unit configured to communicate with a server apparatus using a second communication method different from the first communication method, a reception unit configured to perform control to receive update information from the server apparatus in a case where the communication apparatus can communicate with the server apparatus via the second communication unit, an update unit configured to perform an update process for updating the communication apparatus using the update information, and a progress management unit configured to perform control to transmit a progress status of a process regarding the update information to the terminal apparatus.

Further features will become apparent from the following description of exemplary embodiments with reference to the attached drawings.

BRIEF DESCRIPTION OF THE DRAWINGS

FIG. 14 is a sequence diagram illustrating an update control process according to a fourth exemplary embodiment.

DESCRIPTION OF THE EMBODIMENTS

Exemplary embodiments will be described below based on the drawings.

Figure 1:
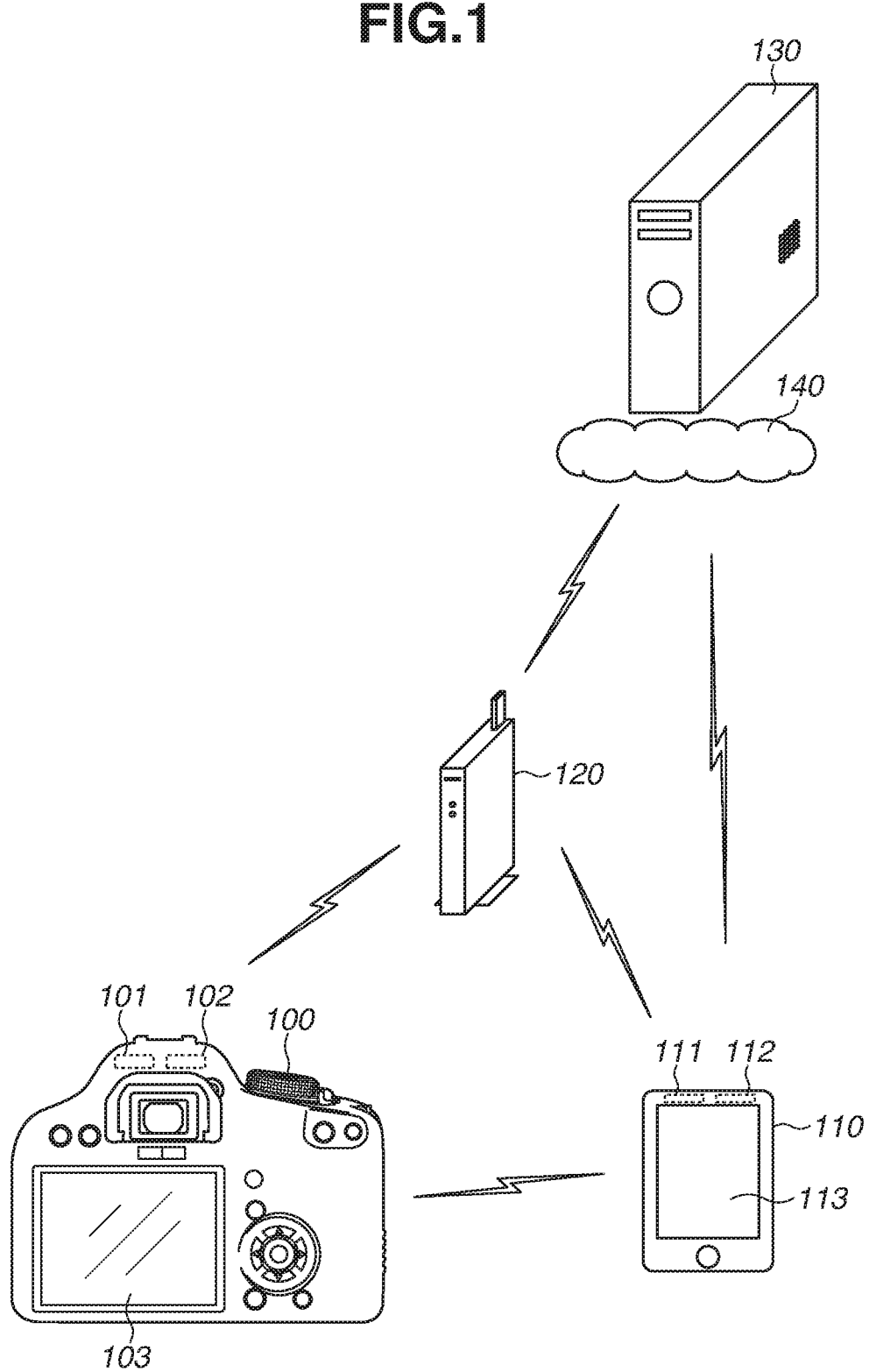
FIG. 1 is a diagram illustrating an entire update system according to a first exemplary embodiment.

FIG. 1 is a diagram illustrating an entire update system according to a first exemplary embodiment. The update system updates firmware of a camera 100 as an example of a communication apparatus. This firmware is information used to update the camera 100 and is an example of update information. In one example, one user owns the camera 100 and a mobile terminal apparatus 110. The user can operate the camera 100 while viewing information displayed on a display unit 103 of the camera 100, and can operate the terminal apparatus 110 while viewing information displayed on a display unit 113 of the terminal apparatus 110. Both the camera 100 and the terminal apparatus 110 can communicate with a server apparatus 130 via a wireless access point (AP) 120 located near the camera 100 and the terminal apparatus 110. The camera 100 and the terminal apparatus 110 can perform short-range wireless communication according to Bluetooth® compliant with the Institute of Electrical and Electronics Engineers (IEEE) 802.15 standard. The server apparatus 130 manages the firmware of the camera 100 and provides new firmware to the camera 100.

A second communication unit 102 of the camera 100 and a second communication unit 112 of the terminal apparatus 110 are interfaces for performing wireless local area network (LAN) communication compliant with the IEEE 802.11 standard (hereinafter referred to as "Wi-Fi"®), for example. The camera 100 can wirelessly communicate with the AP 120 using Wi-Fi®. The camera 100 can transmit and receive data to and from the server apparatus 130 on the Internet 140 via the AP 120 using an upper layer protocol such as Transmission Control Protocol/Internet Protocol (TCP/IP). The camera 100 can also communicate with the terminal apparatus 110 via the AP 120.

A first communication unit 101 of the camera 100 and a first communication unit 111 of the terminal apparatus 110 perform the short-range wireless communication according to Bluetooth® compliant with the IEEE 802.15 standard, for example. The camera 100 and the terminal apparatus 110 can wirelessly communicate with each other through the Bluetooth® communication. This Bluetooth communication uses Bluetooth® Low Energy. In Bluetooth® Low Energy communication, a range where communication can be performed is smaller (i.e., a distance at which communication can be performed is shorter) than that in Wi-Fi® communication. A communication speed of the Bluetooth® Low Energy communication is slower than that of the Wi-Fi® communication. The Bluetooth® Low Energy communication is characterized by having lower power consumption than the Wi-Fi® communication. As described above, the first communication unit 101 and the second communication unit 102 of the camera 100 communicate using different communication methods. Similarly, the first communication unit 111 and the second communication unit 112 of the terminal apparatus 110 also communicate using different communication methods.

Figure 2:
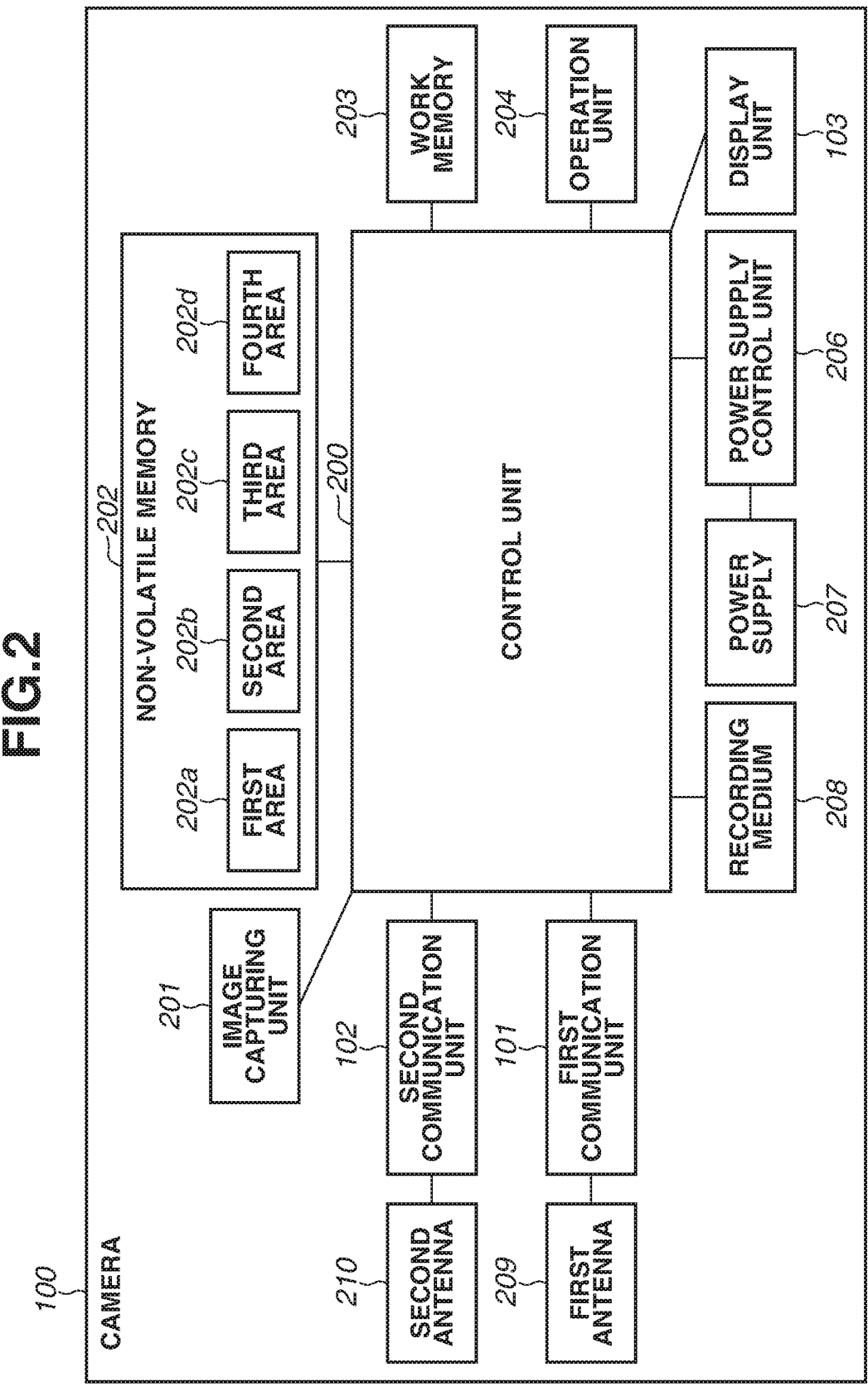
FIG. 2 is a block diagram illustrating a hardware configuration of a camera.

FIG. 2 is a hardware configuration diagram of the camera 100. According to an input signal or a program described below, a control unit 200 controls components of the camera 100. The control unit 200 is a central processing unit (CPU), for example. A non-volatile memory 202 is an electrically erasable and recordable non-volatile memory and stores various types of data, various programs, and the like. A function and processing of the camera 100 are achieved by the control unit 200 reading a program stored in the non-volatile memory 202 and executing the program. Alternatively, as another example, the first communication unit 101 may read a program stored in a recording medium 208 such as a Secure Digital (SD) card instead of the non-volatile memory 202. As still yet another example, the camera 100 may include a plurality of control units and a plurality of non-volatile memories, and at least a part of the processing of the camera 100 described below may be achieved by cooperation of the plurality of control units and the plurality of non-volatile memories. And as still yet another example, at least a part of the processing of the camera 100 may be achieved using a hardware circuit other than the control unit 200.

The non-volatile memory 202 includes four areas, including a first area 202a, a second area 202b, a third area 202c, and a fourth area 202d. The first area 202a is an area for firmware other than that for Bluetooth® Low Energy. The second area 202b is an area for second firmware for the Bluetooth® Low Energy communication. The third area 202c is an area for first firmware for the Bluetooth® Low Energy communication. In this case, the firmware of the Bluetooth® Low Energy communication includes both a driver portion for performing the Bluetooth® Low Energy communication with an opposing device and an interface for communicating with the control unit 200. The fourth area 202d is an area for other firmware unrelated to a normal operation.

Figure 3:
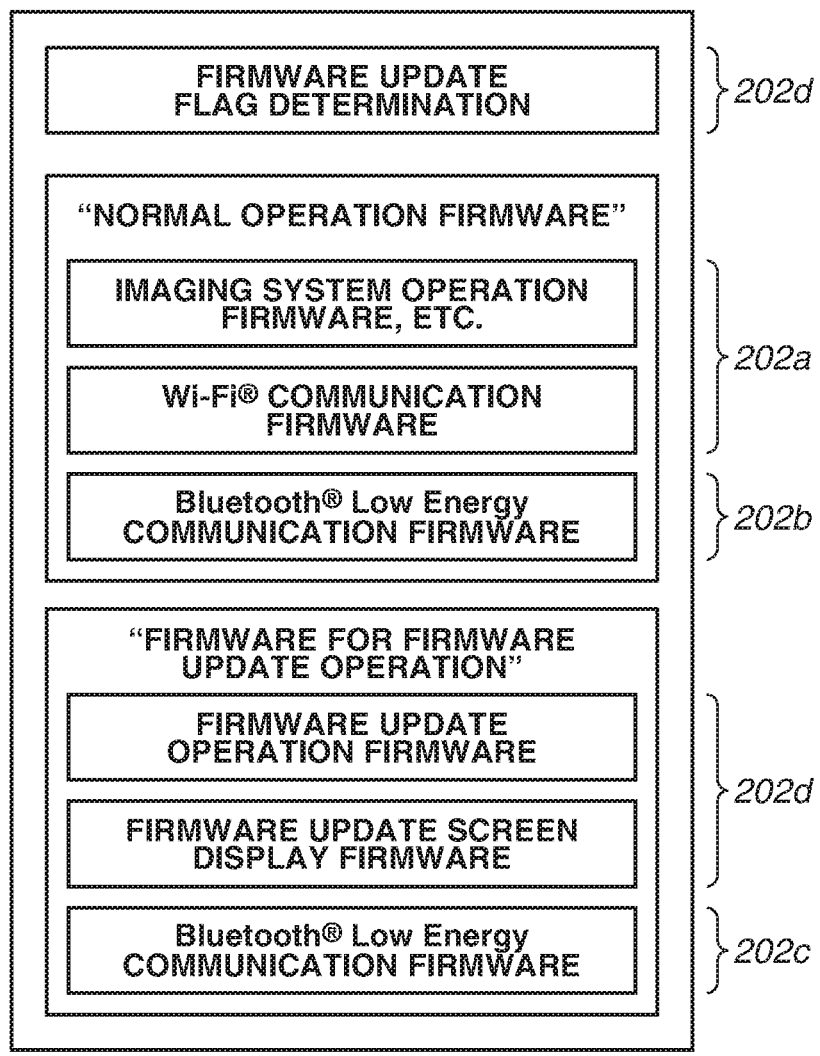
FIG. 3 is a block diagram schematically illustrating a memory map of a non-volatile memory.

FIG. 3 is a schematic diagram illustrating a memory map of the non-volatile memory 202. In the memory map, "normal operation firmware" is an area for firmware that operates when the camera 100 is normally used. The "normal operation firmware" includes operation firmware for an imaging system, operation firmware for a display system, and communication firmware for communication with an external device. The "normal operation firmware" also includes operation firmware for the Wi-Fi® communication and operation firmware for the Bluetooth® Low Energy communication. The "normal operation firmware" corresponds to the first area 202a and the second area 202b. The "firmware for firmware update operation" includes not only operation firmware to be used when the firmware is updated and operation firmware for displaying a screen when the firmware is updated, but also operation firmware for the Bluetooth® Low Energy communication. The "firmware for firmware update operation" includes the third area 202c and the fourth area 202d. If the user selects the update of the firmware, the "firmware for firmware update operation" starts operating according to "firmware update flag determination" and operates so as to rewrite all the "normal operation firmware" portion. At this time, since the third area 202c is also included in the "firmware for firmware update operation", the Bluetooth® Low Energy communication can be performed even during the update of the firmware.

Regarding firmware for the Bluetooth® Low Energy, the second area 202b is copied to the third area 202c at a timing when a power supply is turned off or on, whereby it is also possible to keep the firmware in the third area 202c up-to-date. In this case, the second area 202b is assigned to the "normal operation firmware", and the third area 202c is assigned to the "firmware for firmware update operation". Alternatively, every time the firmware is written, the second area 202b and the third area 202c may be switched by assigning the second area 202b to the "firmware for firmware update operation" and the third area 202c to the "normal operation firmware".

Referring back to FIG. 2, an image capturing unit 201 performs the following process. In a case where an optical image of an object is formed by a lens included in the image capturing unit 201, the image capturing unit 201 converts the optical image of the object into an electric signal, performs a noise reduction process on the electric signal, and outputs digital data as image data. The captured image data is stored in a buffer memory, then the control unit 200 performs a predetermined calculation on the image data, and records it in the recording medium 208. A work memory 203 is used, for example, as a buffer memory for temporarily holding the image data captured by the image capturing unit 201, an image display memory for the display unit 103, and a work area for the control unit 200.

An operation unit 204 is used by the user to input an instruction to the camera 100. The operation unit 204 includes operation members such as a power button for the user to give an instruction to turn on or off the camera 100, a release switch for the user to give an instruction to capture an image, and a reproduction button for the user to give an instruction to reproduce image data. The operation unit 204 also includes a touch panel formed on the display unit 103. The release switch includes switches SW1 and SW2. The release switch enters a half pressed state, thereby turning on the switch SW1. With this operation, the operation unit 204 receives an instruction to make image capturing preparations for an autofocus (AF) process, an automatic exposure (AE) process, an automatic white balance (AWB) process, and a pre-flash process. The release switch enters a full pressed state, thereby turning on the switch SW2. With this operation, the operation unit 204 receives an instruction to capture an image.

The display unit 103 displays a viewfinder image when an image is captured, displays captured image data, and displays characters for an interactive operation. The display unit 103 does not necessarily need to be included in the camera 100. The camera 100 only needs to be capable of connecting to the display unit 103 and at least have a display control function for controlling display of the display unit 103. Similarly, the terminal apparatus 110 includes the display unit 113.

A power supply control unit 206 controls supply of power to the components of the camera 100. In the present exemplary embodiment, a description is provided taking as an example a case where a power supply 207, which is an attachable and detachable battery, is employed as a power supply source. The present disclosure, however, is not limited to this. For example, the configuration may be such that the power is obtained external to the camera 100 via an alternating current (AC) adapter. The recording medium 208 can record an image output from the image capturing unit 201. The recording medium 208 may be configured to be attachable to and detachable from the camera 100, or may be built in the camera 100. More specifically, the camera 100 only needs to have at least a method for accessing the recording medium 208. A first antenna 209 is an antenna for Bluetooth® Low Energy (the first communication unit 101). A second antenna 210 is an antenna for Wi-Fi® (the second communication unit 102). Alternatively, the first antenna 209 and the second antenna 210 may be combined into a single antenna, or two first antennas 209 and two second antennas 210 may be provided. At least one antenna only needs to be provided.

At a place within reach of radio waves of a public telephone network or Wi-Fi®, the terminal apparatus 110 can always connect to the Internet 140 and can also access the server apparatus 130, in which the firmware of the camera 100 is placed. In terms of consumption of the battery, it is unrealistic to always leave the camera 100 communicating through Wi-Fi®. Thus, to check whether the firmware is updated, the camera 100 needs to take the trouble to connect to the server apparatus 130. In view of the characteristics of these two devices, the following process is desirable. The terminal apparatus 110 accesses the server apparatus 130 to check whether the firmware of the camera 100 is updated. Then, the terminal apparatus 110 notifies the camera 100 of information regarding an update of the firmware through the Bluetooth® Low Energy communication, through which the terminal apparatus 110 can always connect to the camera 100 and which consumes low power. Then, the camera 100 downloads the firmware. When the camera 100 downloads the firmware, it is desirable that the camera 100 use Wi-Fi®, through which the camera 100 can communicate at high speed and can communicate with an access point that enables the camera 100 to connect to the Internet 140.

Figure 4:
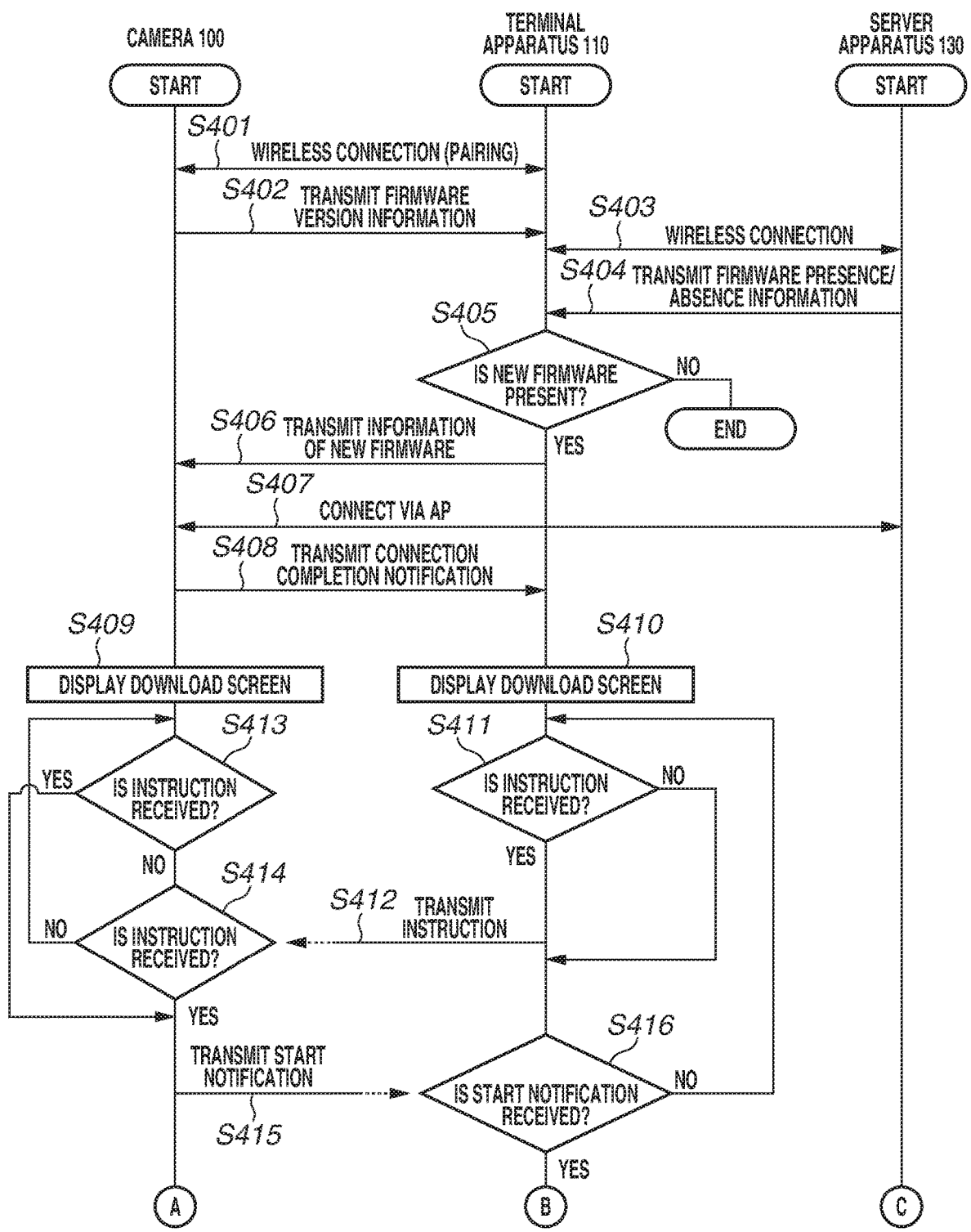
FIG. 4 is a sequence diagram illustrating an update control process.
Figure 5:
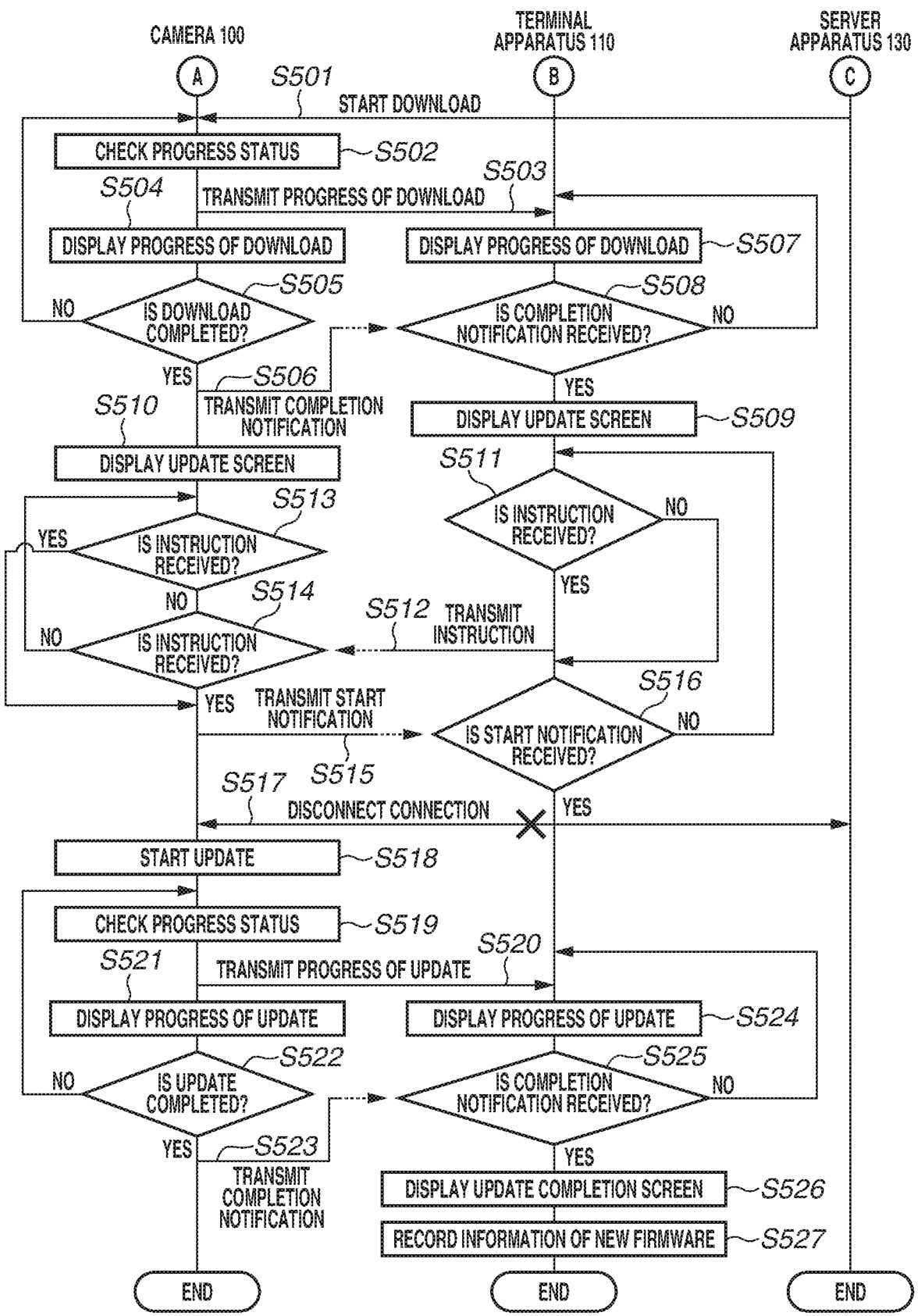
FIG. 5 is a sequence diagram illustrating the update control process.

FIGS. 4 and 5 are sequence diagrams illustrating an update control process performed by the update system. The update control process is information processing for downloading firmware as described above. FIGS. 6A to 6D are diagrams illustrating examples of display screens displayed on the terminal apparatus 110 in the update control process. FIGS. 7A to 7D are diagrams illustrating examples of display screens displayed on the camera 100 in the update control process. When the processing is started, the Bluetooth® Low Energy communication between the camera 100 and the terminal apparatus 110 is in an on state. The processes of the camera 100 in the update control process are achieved by the control unit 200 of the camera 100 reading a program stored in the non-volatile memory 202 and executing the program. Similarly, the processes of the terminal apparatus 110 and the server apparatus 130 in the update control process are achieved by control units of the terminal apparatus 110 and the server apparatus 130 reading programs stored in non-volatile memories and executing the programs.

First, in step S401, the camera 100 starts transmitting an advertising packet. Transmission of the advertising packet is a connection waiting operation in which a packet including connection information is transmitted by broadcasting to many and unspecified devices, and any of these devices as a connection destination receives the packet, thereby enabling a connection. When the camera 100 is in this state, and if an operation for connecting the terminal apparatus 110 to the camera 100 is performed, the terminal apparatus 110 performs a scan operation for detecting the advertising packet. If detecting the advertising packet, the terminal apparatus 110 transmits a wireless connection request to shift to a connection state. The camera 100 receives the wireless connection request, and the camera 100 and the terminal apparatus 110 perform a wireless connection operation (hereinafter referred to as "pairing"). By this series of pairing operations, the camera 100 is always capable of connecting to the terminal apparatus 110 and thereby can immediately respond to an instruction from the terminal apparatus 110. Even if the connection is temporarily disconnected, since the camera 100 stores information of the connection partner, the camera 100 can automatically connect to the connection partner if detecting the connection partner again.

Next, in step S402, the camera 100 transmits firmware version information to the terminal apparatus 110. The firmware version information is information of the firmware version and the like of the camera 100 at the time of a process of step S402. If receiving the firmware version information, the terminal apparatus 110 records the firmware version information in a management table provided in a non-volatile memory 202 of the terminal apparatus 110. The firmware version information may be temporarily held only during the pairing. Next, in step S403, the terminal apparatus 110 wirelessly connects to the server apparatus 130. This connection method may be any method for enabling a connection such as Long Term Evolution (LTE). Next, in step S404, the terminal apparatus 110 receives firmware presence/absence information indicating whether firmware (hereinafter referred to as "new firmware") newer than the firmware of the camera 100 and corresponding to the camera 100 is present. The server apparatus 130 may transmit the firmware presence/absence information to the terminal apparatus 110 based on the server apparatus 130 being wirelessly connected to the terminal apparatus 110. Alternatively, as another example, the server apparatus 130 may transmit the firmware presence/absence information in response to an inquiry from the terminal apparatus 110.

Next, in step S405, based on the firmware presence/absence information, the terminal apparatus 110 checks presence or absence of the new firmware. If it is determined that the new firmware is present (YES in step S405), the processing proceeds to step S406. If it is determined that the new firmware is not present (NO in step S405), the update control process ends. In step S406, the terminal apparatus 110 transmits firmware information of the new firmware to the camera 100. The firmware information of the new firmware includes information indicating the presence of the new firmware, and information of a storage location and the like of the new firmware.

If receiving the firmware information of the new firmware in step S406, in step S407, the camera 100 activates Wi-Fi®. Then, the camera 100 wirelessly connects to the server apparatus 130 via the AP 120. The camera 100 stores Service Set Identifier (SSID) information of the AP 120 in advance in the non-volatile memory 202 and the like. If detecting the SSID of the AP 120 from beacon information of the AP 120, the camera 100 connects to the AP 120. Then, the camera 100 connects to the server apparatus 130 via the AP 120. The camera 100 determines whether the camera 100 has connected to the server apparatus 130 via the AP 120. If the AP 120 is not found, the camera 100 sets a timeout and the like, and the processing ends. If the camera 100 checks connection with the server apparatus 130, the processing proceeds to step S408. The wireless connection between the camera 100 and the server apparatus 130 only needs to be completed before the process of step S408, and may be executed at an earlier timing such as a timing of the process of step S401. The process of step S407 is an example of a communication management process for performing control to enable the server apparatus 130 and the second communication unit 102 to communicate with each other in a case where the camera 100 receives, from the terminal apparatus 110, information that the new firmware as update information is present in the server apparatus 130.

In step S408, the camera 100 transmits, to the terminal apparatus 110, a connection completion notification that the connection with the server apparatus 130 is completed. Next, in step S409, the camera 100 performs control to display a download screen on the display unit 103. This download screen is a screen for receiving, from the user, an instruction whether to receive the new firmware and record in the recording medium 208. A processing order of steps S408 and S409 is not limited to that in the exemplary embodiment. Alternatively, step S408 may be executed after step S409, or steps S408 and S409 may be simultaneously executed. If receiving the connection completion notification in step S408, in step S410, the terminal apparatus 110 performs control to display a download screen on the display unit 113. Similar to the download screen displayed in step S409, this download screen is a screen for receiving, from the user, an instruction whether to download the new firmware of the camera 100 to the recording medium 208 of the camera 100.

Figure 6A:
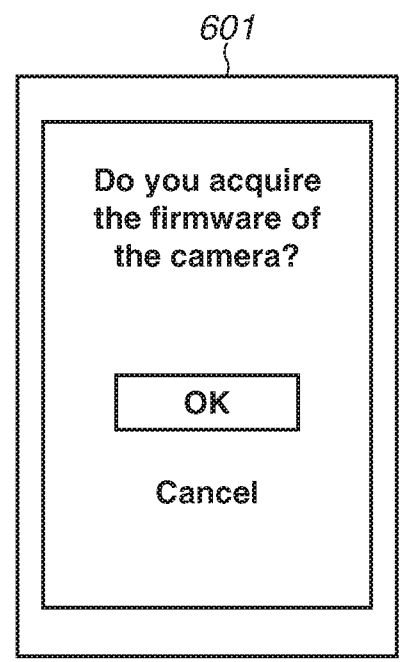
FIGS. 6A, 6B, 6C, and 6D are diagrams illustrating examples of display screens displayed on a terminal apparatus.
Figure 7A:
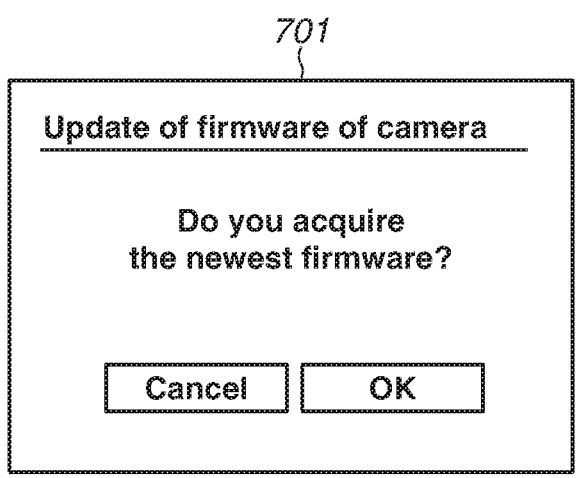
FIGS. 7A, 7B, 7C, and 7D are diagrams illustrating examples of display screens displayed on the camera.

FIG. 6A is a diagram illustrating an example of a download screen 601, which is displayed on the display unit 113 of the terminal apparatus 110 in step S410. FIG. 7A is a diagram illustrating an example of a download screen 701, which is displayed on the display unit 103 of the camera 100 in step S409. If a user operation for starting download is performed on either of the download screens 601 and 701, the camera 100 and the terminal apparatus 110 display a progress status of the download to the camera 100 on the display units 103 and 113, respectively. Specifically, the following processing is performed.

After the process of step S410, in step S411, the terminal apparatus 110 checks whether the terminal apparatus 110 has received a download start instruction according to the user operation. If it is determined that the terminal apparatus 110 has received the instruction (YES in step S411), the processing proceeds to step S412. If it is determined that the terminal apparatus 110 has not received the instruction (NO in step S411), the processing proceeds to step S416. In step S412, the terminal apparatus 110 transmits the download start instruction to the camera 100. Then, the processing proceeds to step S416.

After the process of step S409, in step S413, the camera 100 checks whether the camera 100 has received a download start instruction according to a user operation. If it is determined that the camera 100 has received the instruction (YES in step S413), the processing proceeds to step S415. If it is determined that the camera 100 has not received the instruction (NO in step S413), the processing proceeds to step S414.

In step S414, the camera 100 checks whether the camera 100 has received a download start instruction from the terminal apparatus 110. The start instruction to be received in step S414 is transmitted in step S412 as described above. If it is determined that the camera 100 has received the start instruction (YES in step S414), the processing proceeds to step S415. If it is determined that the camera 100 has not received the start instruction (NO in step S414), the processing proceeds to step S413. In step S415, the camera 100 transmits, to the terminal apparatus 110, a start notification that the camera 100 is to start the download. Then, the processing proceeds to step S501 (FIG. 5). In step S416, the terminal apparatus 110 checks whether the terminal apparatus 110 has received a start notification from the camera 100. If it is determined that the terminal apparatus 110 has received the start notification (YES in step S416), the processing proceeds to step S503 (FIG. 5). In step S503, the terminal apparatus 110 waits until the terminal apparatus 110 receives the progress status of the download. If it is determined that the terminal apparatus 110 has not received the start notification (NO in step S416), the processing proceeds to step S411.

Figure 7B:
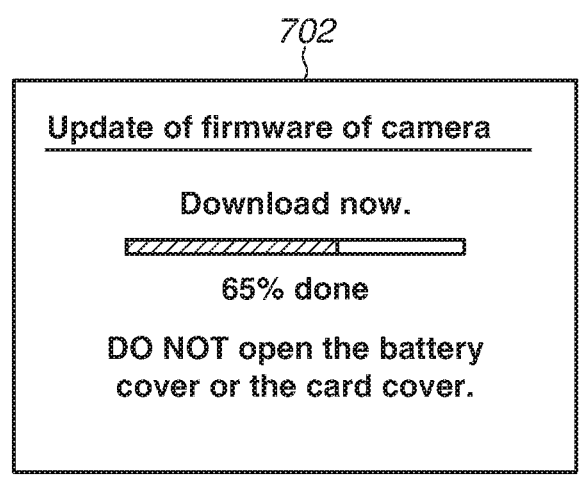

In step S501 in FIG. 5, the camera 100 starts downloading the new firmware from the server apparatus 130. The process of step S501 is an example of a reception process for, in a case where the camera 100 can communicate with the server apparatus 130, performing control to receive the new firmware as update information from the server apparatus 130. Next, in step S502, the camera 100 checks the progress status of the download. Then, in step S503, the camera 100 transmits the progress status of the download to the terminal apparatus 110 through the Bluetooth® Low Energy communication. This process is an example of a progress management process for performing control to transmit the progress status of a process regarding the update information. As described above, the camera 100 starts transmitting progress information at a timing when the camera 100 starts receiving the new firmware. Then, in step S504, the camera 100 performs control to display the progress status of the download on the display unit 103. By the process of step S504, the display unit 103 displays a progress screen 702, which is illustrated in FIG. 7B. The progress screen 702 displays a progress bar indicating the progress status.

Referring back to FIG. 5, after step S504, in step S505, the camera 100 checks whether the download is completed. If it is determined that the download is completed (YES in step S505), the processing proceeds to step S506. In step S506, the camera 100 transmits, to the terminal apparatus 110, a completion notification that the download is completed. In step S505, if it is determined that the download is not completed (NO in step S505), the processing proceeds to step S502. In step S502, the camera 100 checks the progress status of the download again. In step S503, the camera 100 transmits the progress status of the download. In step S504, the camera 100 updates the display of the progress status of the download. Specifically, the camera 100 updates the display of the progress bar. The camera 100 periodically repeats the processes of steps S502 to S504 and thereby can continue transmitting the progress information and also sequentially update the display of the progress status on the progress screen 702.

Figure 6B:
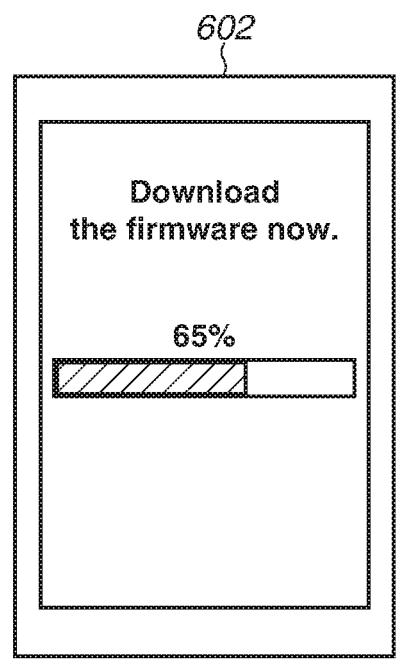

If the progress status of the download is received in step S503, in step S507, the terminal apparatus 110 performs control to display the progress status of the download on the display unit 113. By the process of step S507, the display unit 113 displays a progress screen 602, which is illustrated in FIG. 6B. The progress screen 602 displays a progress bar indicating the progress status. After the process of step S507, in step S508, the terminal apparatus 110 checks whether the terminal apparatus 110 has received a completion notification from the camera 100. If it is determined that the terminal apparatus 110 has not received the completion notification (NO in step S508), the processing proceeds to step S503. In step S503, the terminal apparatus 110 waits to receive the progress status from the camera 100. If receiving the progress status, in step S507, the terminal apparatus 110 updates the display of the progress status of the download. The terminal apparatus 110 repeats steps S503 and S507 and thereby can sequentially update the display of the progress status on the progress screen 602. If it is determined, in step S508, that the terminal apparatus 110 has received the completion notification (YES in step S508), the terminal apparatus 110 ends the display of the progress screen 602, and the processing proceeds to step S509.

Figure 6C:
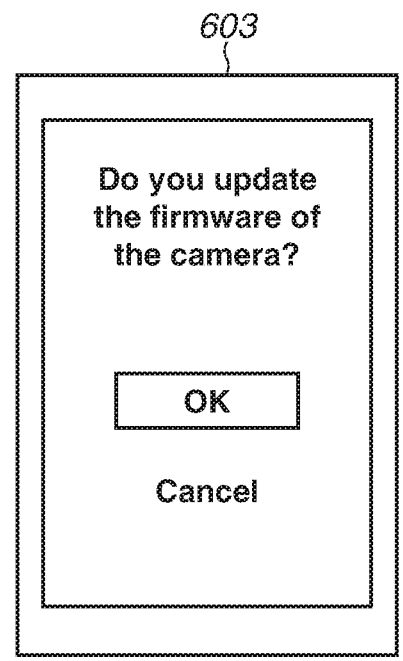
Figure 7C:

In step S509, the terminal apparatus 110 indicates, on the display unit 113, that the download is completed. Then, the terminal apparatus 110 performs control to display an update screen. This update screen is a screen for receiving, from the user, an instruction whether to execute an update process for updating the firmware using the new firmware downloaded by the camera 100. FIG. 6C is a diagram illustrating an example of an update screen 603, which is displayed on the display unit 113 of the terminal apparatus 110 in step S509. After the process of step S506, in step S510, the camera 100 also displays, on the display unit 103, that the download is completed. Then, the camera 100 performs control to display an update screen. FIG. 7C is a diagram illustrating an example of an update screen 703, which is displayed on the display unit 103 of the camera 100 in step S510.

If a user operation for starting an update is performed on either of the update screens 603 and 703, the camera 100 and the terminal apparatus 110 display a progress status of the update process for updating the firmware of the camera 100 on the display units 103 and 113, respectively. Specifically, the following processing is performed.

After the process of step S509, in step S511, the terminal apparatus 110 checks whether the terminal apparatus 110 has received an update start instruction based on the user operation. If it is determined that the terminal apparatus 110 has received the instruction (YES in step S511), the processing proceeds to step S512. If it is determined that the terminal apparatus 110 has not received the instruction (NO in step S511), the processing proceeds to step S516. In step S512, the terminal apparatus 110 transmits the update start instruction to the camera 100. Then, the processing proceeds to step S516.

After the process of step S510, in step S513, the camera 100 checks whether the camera 100 has received an update start instruction based on the user operation. If it is determined that the camera 100 has received the instruction (YES in step S513), the processing proceeds to step S515. If it is determined that the camera 100 has not received the instruction (NO in step S513), the processing proceeds to step S514. In step S514, the camera 100 checks whether the camera 100 has received the update start instruction from the terminal apparatus 110. The start instruction to be received in step S514 is transmitted in step S512 as described above. If it is determined that the camera 100 has received the start instruction (YES in step S514), the processing proceeds to step S515. If it is determined that the camera 100 has not received the start instruction (NO in step S514), the processing proceeds to step S513. In step S515, the camera 100 transmits, to the terminal apparatus 110, a start notification that the camera 100 is to start an update. Then, the processing proceeds to step S517.

In step S516, the terminal apparatus 110 checks whether the terminal apparatus 110 has received the start notification from the camera 100. If it is determined that the terminal apparatus 110 has received the start notification (YES in step S516), the processing proceeds to step S524. In step S524, the terminal apparatus 110 waits until the terminal apparatus 110 receives a progress status of the update. If the terminal apparatus 110 has not received the start notification (NO in step S516), the processing proceeds to step S511.

Figure 7D:
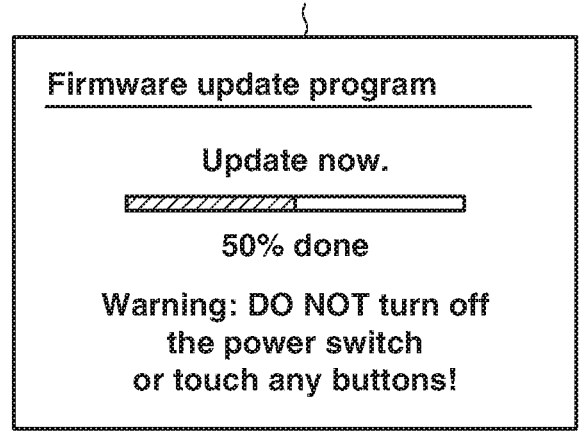

In step S517, to perform the update process for updating the firmware, the camera 100 disconnects the Wi-Fi® communication. Next, in step S518, the camera 100 starts the update process for updating the firmware using the new firmware. Next, in step S519, the camera 100 checks the progress status of the update process. Next, in step S520, the camera 100 transmits the progress status of the update process to the terminal apparatus 110 through the Bluetooth® Low Energy communication. Next, in step S521, the camera 100 performs control to display the progress status of the update process on the display unit 103. By the process of step S521, the display unit 103 displays a progress screen 704, which is illustrated in FIG. 7D. The progress screen 704 displays a progress bar indicating the progress status.

Referring back to FIG. 5, after step S521, in step S522, the camera 100 checks whether the update process is completed. If it is determined that the update process is completed (YES in step S522), the processing proceeds to step S523. In step S523, the camera 100 transmits, to the terminal apparatus 110, a completion notification that the update process is completed. Thus, the processing of the camera 100 ends. As described above, the camera 100 performs control to continue transmitting the progress status of the update process until a timing when the update process is completed. If it is determined in step S522 that the update process is not completed (NO in step S522), the processing proceeds to step S519. In this case, in step S519, the camera 100 checks the progress status of the update process again. In step S520, the camera 100 transmits the progress status of the update process. In step S521, the camera 100 updates the display of the progress status of the update process. Specifically, the camera 100 updates the display of the progress bar. The camera 100 periodically repeats the processes of steps S519 to S521 and thereby can sequentially update the display of the progress status on the progress screen 704.

Figure 6D:
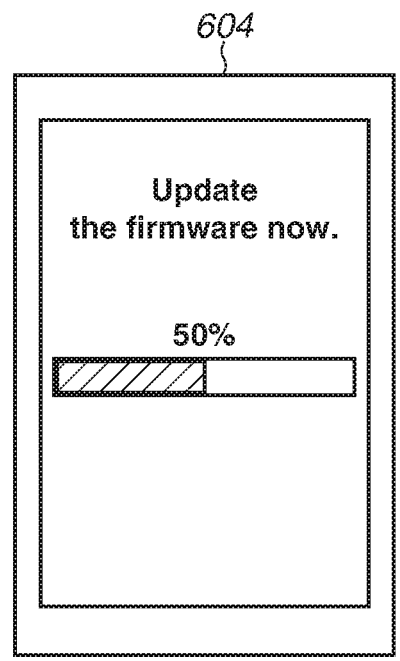

If the progress status of the update process is received in step S520, in step S524, the terminal apparatus 110 performs control to display the progress status of the update process on the display unit 113. By the process of step S524, the display unit 113 displays a progress screen 604, which is illustrated in FIG. 6D. The progress screen 604 displays a progress bar indicating the progress status. After the process of step S524, in step S525, the terminal apparatus 110 checks whether the terminal apparatus 110 has received a completion notification from the camera 100. If it is determined that the terminal apparatus 110 has not received the completion notification (NO in step S525), the processing proceeds to step S520. In step S520, the terminal apparatus 110 waits to receive the progress status from the camera 100. If receiving the progress status, in step S524, the terminal apparatus 110 updates the display of the progress status of the update process. The terminal apparatus 110 repeats steps S520 and S524 and thereby can sequentially update the display of the progress status on the progress screen 604.

If it is determined in step S525 that the terminal apparatus 110 has received the completion notification (YES in step S525), the terminal apparatus 110 ends the display of the progress screen 604, and the processing proceeds to step S526. In step S526, the terminal apparatus 110 performs control to display, on the display unit 113, an update completion screen indicating that the update process is completed. Next, in step S527, the terminal apparatus 110 records the firmware information of the new firmware. Thus, the processing of the terminal apparatus 110 ends. On the download screens 601 and 701 and the update screens 603 and 703, options for cancellation may be prepared. Then, if cancellation is selected, the download process or the update process may end.

As described above, in the update system according to the present exemplary embodiment, an instruction is provided to download or update the firmware using either the camera 100 or the terminal apparatus 110. The progress status of each process is displayed not only on the display unit 103 of the camera 100 but also on the display unit 113 of the terminal apparatus 110. Thus, the user can check the progress status regarding the update of the firmware on the terminal apparatus 110. According to the update system of the present exemplary embodiment, the user can input an instruction to update the firmware and can check the progress status of the update using only the terminal apparatus 110. More specifically, managing and updating the firmware of the camera 100 can be accomplished via the terminal apparatus 110 without using the camera 100 as long as pairing is performed between the camera 100 and the terminal apparatus 110.

As a first modification of the first exemplary embodiment, only the display unit 113 of the terminal apparatus 110 displays the download screen, the update screen, the progress status of the download process, and the progress status of the update process.

Further, as a second modification, if the camera 100 has received the download start instruction, only the display unit 103 of the camera 100 displays the progress status of the download, and the display unit 113 of the terminal apparatus 110 does not display the progress status of the download. If the terminal apparatus 110 has received the download start instruction, only the display unit 113 of the terminal apparatus 110 displays the progress status of the download, and the display unit 103 of the camera 100 does not display the progress status of the download. The user is less likely to check a screen of a device that is not being operated by the user. Thus, in terms of power saving, only the display unit of one of the devices displays the progress status.

As a third modification, without any need for an instruction from the user and under a condition that the AP 120 is detected, the camera 100 may automatically download and update the firmware.

As a fourth modification, if the camera 100 has received input of the start instruction in step S413 in FIG. 4 or if the camera 100 has received the start instruction in step S414 in FIG. 4, the processing may proceed to step S501 without the camera 100 performing the process of step S415. In this case, in step S416 illustrated in FIG. 4, the terminal apparatus 110 may check whether the terminal apparatus 110 has received the progress status of the download. Then, if the terminal apparatus 110 has received the progress status of the download, the processing may proceed to step S507. Also in steps S515 and S516, similar processes can be performed.

As a fifth modification, without any need for the input of the start instruction to the camera 100 or the terminal apparatus 110 and under a condition that new firmware is present in the server apparatus 130, the camera 100 may automatically start the download process or the update process.

In an update system according to a second exemplary embodiment, firmware is downloaded from the server apparatus 130 via the terminal apparatus 110. For example, the update system according to the second exemplary embodiment is suitable for a case where the camera 100 cannot find the AP 120. When the firmware is downloaded via the AP 120, the time until an update of the firmware is shortened, while the AP 120 may not be found. In such a case, if the terminal apparatus 110 downloads the firmware from the server apparatus 130 using a public telephone network and the like, it is possible to perform processing to a point where the firmware is locally saved. This further increases certainty.

Figure 8:
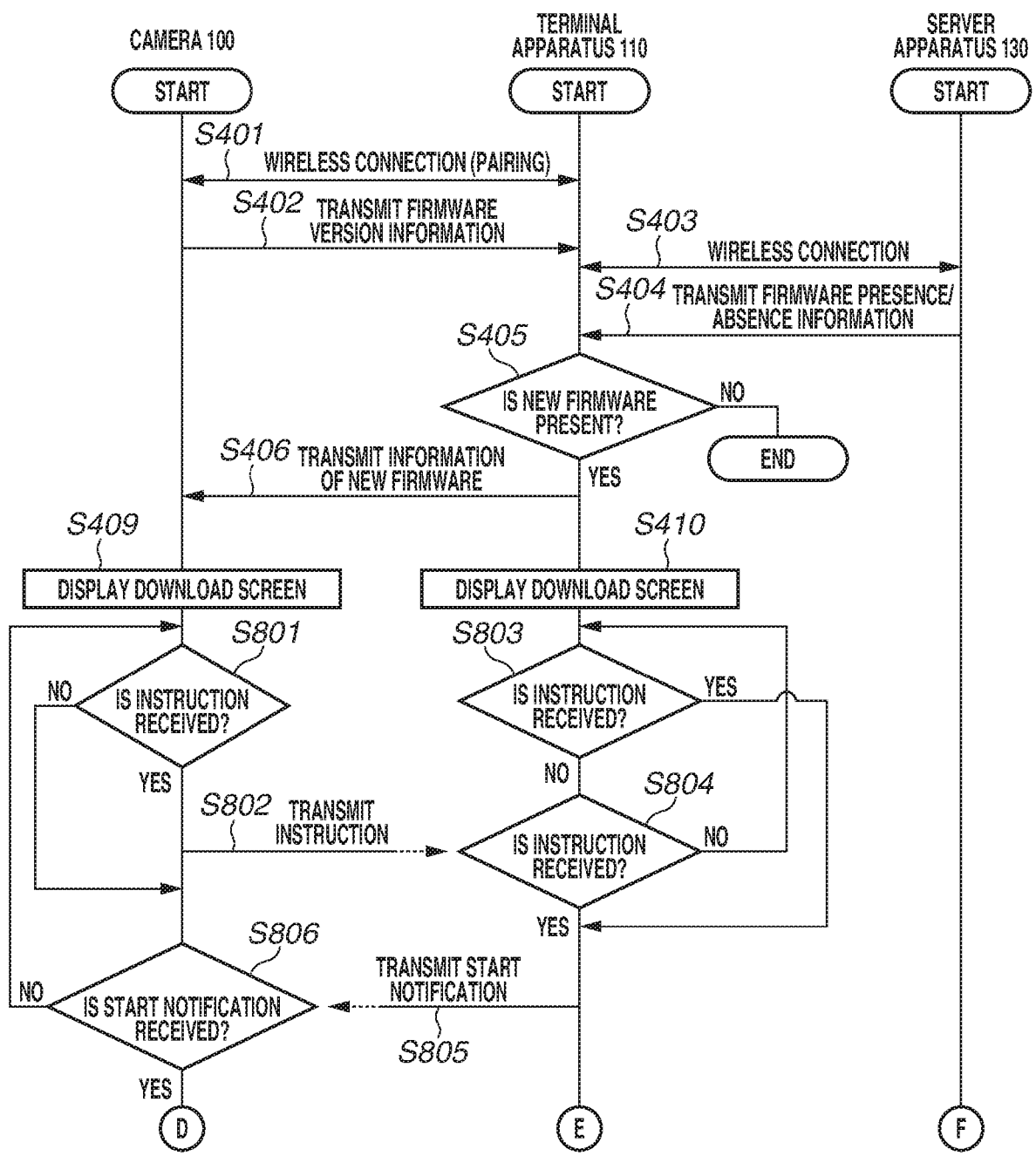
FIG. 8 is a sequence diagram illustrating an update control process according to a second exemplary embodiment.
Figure 9:
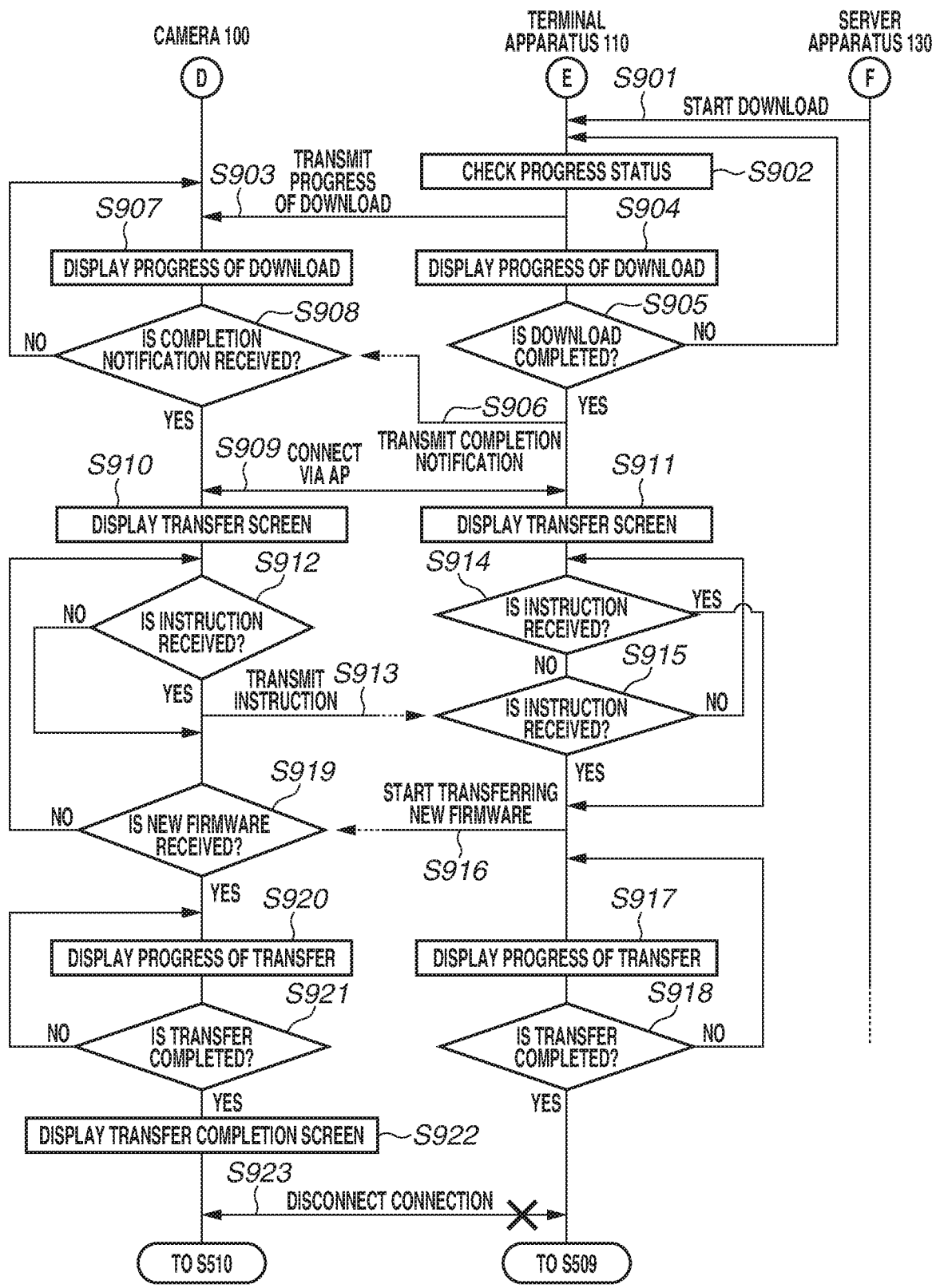
FIG. 9 is a sequence diagram illustrating the update control process according to the second exemplary embodiment.
Figure 10A:
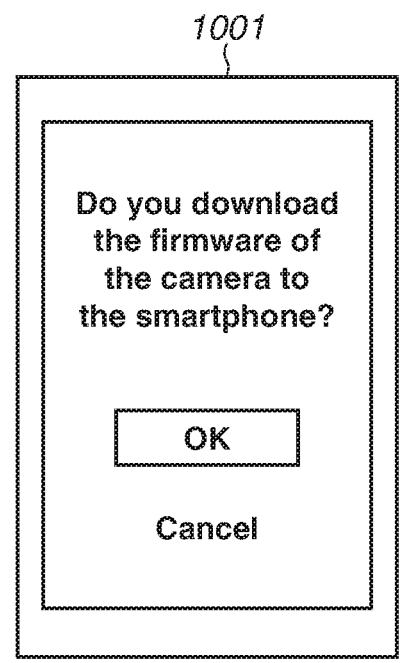
FIGS. 10A, 10B, and 10C are diagrams illustrating examples of display screens displayed on a terminal apparatus.
Figure 10B:
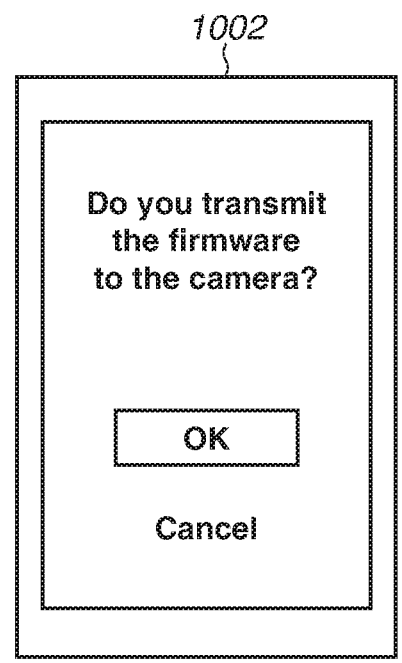
Figure 10C:
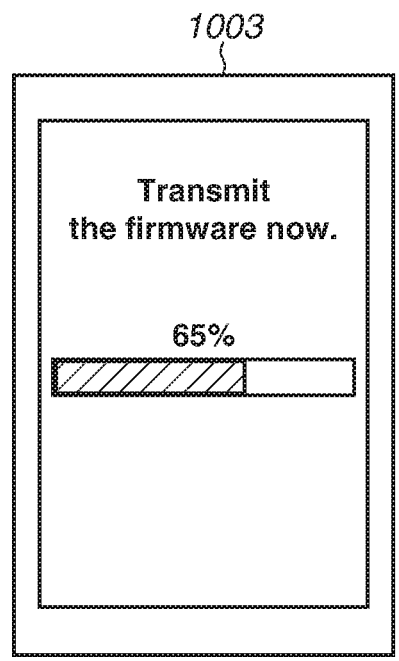
Figure 11A:
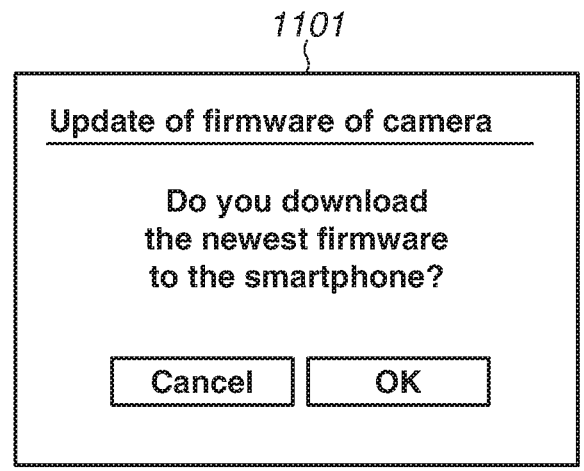
FIGS. 11A, 11B, and 11C are diagrams illustrating examples of display screens displayed on a camera.
Figure 11B:
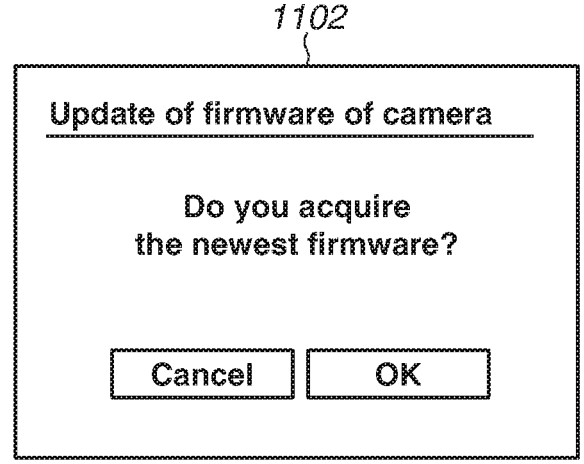
Figure 11C:
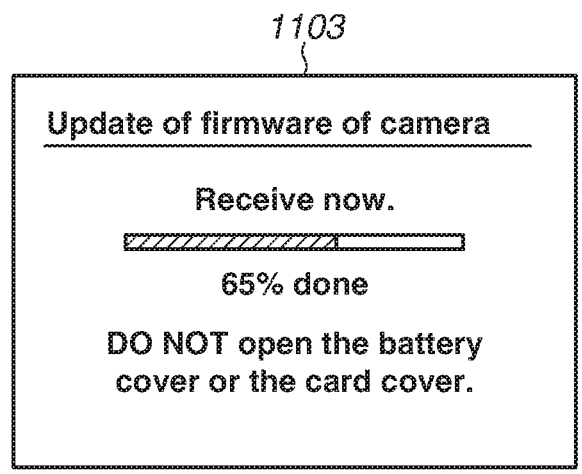

FIGS. 8 and 9 are sequence diagrams illustrating an update control process according to the second exemplary embodiment. FIGS. 10A to 10C are diagrams illustrating examples of display screens displayed on the terminal apparatus 110 in the update control process. FIGS. 11A to 11C are diagrams illustrating examples of display screens displayed on the camera 100 in the update control process. Among processes in a download process illustrated in FIG. 8, processes similar to those in the download process according to the first exemplary embodiment described with reference to FIG. 4 are designated by the same numbers.

As illustrated in FIG. 8, after the terminal apparatus 110 transmits the firmware information of the new firmware in step S406, the processing proceeds to step S410. In step S410, the terminal apparatus 110 performs control to display a download screen. FIG. 10A is a diagram illustrating an example of a download screen 1001, which is displayed on the display unit 113 of the terminal apparatus 110 in step S410. After the camera 100 receives the firmware information of the new firmware in step S406, the processing proceeds to step S409. In step S409, the camera 100 performs control to display a download screen. FIG. 11A is a diagram illustrating an example of a download screen 1101, which is displayed on the display unit 103 of the camera 100 in step S409. Alternatively, as another example, the camera 100 may omit the display of the download screen (step S409).

Next, if a start instruction is received on the download screen of either the camera 100 or the terminal apparatus 110, the terminal apparatus 110 starts the download. More specifically, after the process of step S409, in step S801, the camera 100 checks whether the camera 100 has received a download start instruction based on a user operation. If it is determined that the camera 100 has received the instruction (YES in step S801), the processing proceeds to step S802. If it is determined that the camera 100 has not received the instruction (NO in step S801), the processing proceeds to step S806. In step S802, the camera 100 transmits the download start instruction to the terminal apparatus 110. Then, the processing proceeds to step S806.

After the process of step S410, in step S803, the terminal apparatus 110 checks whether the terminal apparatus 110 has received a download start instruction based on a user operation. If it is determined that the terminal apparatus 110 has received the instruction (YES in step S803), the processing proceeds to step S805. If it is determined that the terminal apparatus 110 has not received the instruction (NO in step S803), the processing proceeds to step S804. In step S804, the terminal apparatus 110 checks whether the terminal apparatus 110 has received a download start instruction from the camera 100. If it is determined that the terminal apparatus 110 has received the start instruction (YES in step S804), the processing proceeds to step S805. If it is determined that the terminal apparatus 110 has not received the start instruction (NO in step S804), the processing proceeds to step S803. In step S805, the terminal apparatus 110 transmits, to the camera 100, a start notification that the terminal apparatus 110 is to start the download. Then, the processing proceeds to step S901 (FIG. 9).

In step S806, the camera 100 checks whether the camera 100 has received a start notification from the terminal apparatus 110. If it is determined that the camera 100 has received the start notification (YES in step S806), the processing proceeds to step S903 (FIG. 9). In step S903, the camera 100 waits until the camera 100 receives the progress status of the download. If the camera 100 has not received the start notification (NO in step S806), the processing proceeds to step S801.

In step S901 in FIG. 9, the terminal apparatus 110 starts downloading the new firmware from the server apparatus 130. Next, in step S902, the terminal apparatus 110 checks the progress status of the download. Next, in step S903, the terminal apparatus 110 transmits the progress status of the download to the camera 100 through the Bluetooth® Low Energy communication. Next, in step S904, the terminal apparatus 110 performs control to display the progress status of the download on the display unit 113. By the process of step S904, the display unit 113 of the terminal apparatus 110 displays the progress screen 602 in FIG. 6B.

Referring back to FIG. 9, after step S904, in step S905, the terminal apparatus 110 checks whether the download is completed. If it is determined that the download is completed (YES in step S905), the processing proceeds to step S906. In step S906, the terminal apparatus 110 transmits, to the camera 100, a completion notification that the download is completed. If the download is not completed in step S905 (NO in step S905), the processing proceeds to step S902.

If the progress status of the download is received in step S903, in step S907, the camera 100 performs control to display the progress status of the download on the display unit 103. Next, in step S908, the camera 100 checks whether the camera 100 has received the completion notification from the terminal apparatus 110. If it is determined that the camera 100 has not received the completion notification (NO in step S908), the processing proceeds to step S903. If it is determined that the camera 100 has received the completion notification (YES in step S908), the camera 100 ends the display of the progress status, and the processing proceeds to step S909.

In step S909, the camera 100 wirelessly connects to the terminal apparatus 110 via the AP 120. During the pairing, the camera 100 transmits in advance, to the terminal apparatus 110, SSID information of the AP 120 to which the camera 100 is to connect. If the terminal apparatus 110 detects the SSID of the AP 120 from beacon information of the AP 120, the terminal apparatus 110 connects to the AP 120. The terminal apparatus 110 notifies the camera 100 that the terminal apparatus 110 has detected the AP 120 to which the camera 100 is to connect. The camera 100 starts Wi-Fi® and connects to the terminal apparatus 110 via the AP 120.

Next, in step S910, the camera 100 performs control to display a transfer screen. This transfer screen is a screen for receiving an instruction whether to receive the new firmware from the terminal apparatus 110 and record in the recording medium 208 of the camera 100. FIG. 11B is a diagram illustrating an example of a transfer screen 1102, which is displayed on the display unit 103 of the camera 100 in step S910. After the process of step S909, in step S911, the terminal apparatus 110 also performs control to display a transfer screen. FIG. 10B is a diagram illustrating an example of a transfer screen 1002, which is displayed on the display unit 113 of the terminal apparatus 110 in step S911.

Next, if a start instruction is received on the transfer screen of either the camera 100 or the terminal apparatus 110, the terminal apparatus 110 starts transferring the new firmware. That is, after the process of step S910, in step S912, the camera 100 checks whether the camera 100 has received a transfer start instruction based on a user operation. If it is determined that the camera 100 has received the instruction (YES in step S912), the processing proceeds to step S913. If it is determined that the camera 100 has not received the instruction (NO in step S912), the processing proceeds to step S919. In step S913, the camera 100 transmits the transfer start instruction to the terminal apparatus 110. Then, the processing proceeds to step S919.

After the process of step S911, in step S914, the terminal apparatus 110 checks whether the terminal apparatus 110 has received a transfer start instruction based on a user operation. If it is determined that the terminal apparatus 110 has received the instruction (YES in step S914), the processing proceeds to step S916. If it is determined that the terminal apparatus 110 has not received the instruction (NO in step S914), the processing proceeds to step S915. In step S915, the terminal apparatus 110 checks whether the terminal apparatus 110 has received a transfer start instruction from the camera 100. If it is determined that the terminal apparatus 110 has received the start instruction (YES in step S915), the processing proceeds to step S916. If it is determined that the terminal apparatus 110 has not received the start instruction (NO in step S915), the processing proceeds to step S914. In step S916, the terminal apparatus 110 starts transferring the new firmware to the camera 100.

Next, in step S917, the terminal apparatus 110 performs control to display a progress status of the transfer on the display unit 113. By the process of step S917, the display unit 113 displays a progress screen 1003 in FIG. 10C. Next, in step S918, the terminal apparatus 110 checks whether the transfer is completed. If it is determined that the transfer is completed (YES in step S918), the processing proceeds to step S923. If it is determined that the transfer is not completed (NO in step S918), the processing proceeds to step S917. In step S917, the terminal apparatus 110 continues displaying the progress status of the transfer while updating the progress status of the transfer. The terminal apparatus 110 may display the progress status based on the transmission state of the new firmware from the terminal apparatus 110. The terminal apparatus 110 may receive, from the camera 100 through the Bluetooth® Low Energy communication, a reception state of the new firmware and display the progress status based on the reception state.

In step S919, the camera 100 checks whether the camera 100 has received the new firmware. If the camera 100 has received the new firmware (YES in step S919), the processing proceeds to step S920. If the camera 100 has not received the new firmware (NO in step S919), the processing proceeds to step S912. In step S920, the camera 100 performs control to display the progress status of the transfer on the display unit 103. By the process of step S920, the display unit 103 displays a progress screen 1103 in FIG. 11C. Next, in step S921, the camera 100 checks whether the transfer is completed. If it is determined that the transfer is completed (YES in step S921), the processing proceeds to step S922. If it is determined that the transfer is not completed (NO in step S921), the processing proceeds to step S920. In step S920, the camera 100 continues displaying the progress status of the transfer while updating the progress status of the transfer.

In step S922, the camera 100 performs control to display a transfer completion screen indicating that the transfer is completed. Next, in step S923, the camera 100 disconnects the Wi-Fi® communication. The processes to be performed by the camera 100 from this point onward are similar to the processes of step S510 and thereafter described with reference to FIG. 5. The processes to be performed by the terminal apparatus 110 from this point onward are similar to the processes of step S509 and thereafter described with reference to FIG. 5. The rest of the configuration and the processing of the update system according to the second exemplary embodiment is similar to the configuration and the processing of the update system according to the first exemplary embodiment.

As described above, in the update system according to the second exemplary embodiment, the terminal apparatus 110 temporarily downloads the new firmware, and the camera 100 receives the new firmware from the terminal apparatus 110. Also in this case, the progress status of each process is displayed not only on the display unit 103 of the camera 100, but also on the display unit 113 of the terminal apparatus 110. Thus, the user can check, on the terminal apparatus 110, a progress status regarding the update of the firmware.

In an update system according to a third exemplary embodiment, a terminal apparatus 110 controls an update of firmware of a plurality of cameras. In the present exemplary embodiment, a description is provided taking as an example a case where the update of the firmware of two cameras is controlled. Alternatively, three or more cameras may be controlled.

Figure 12:
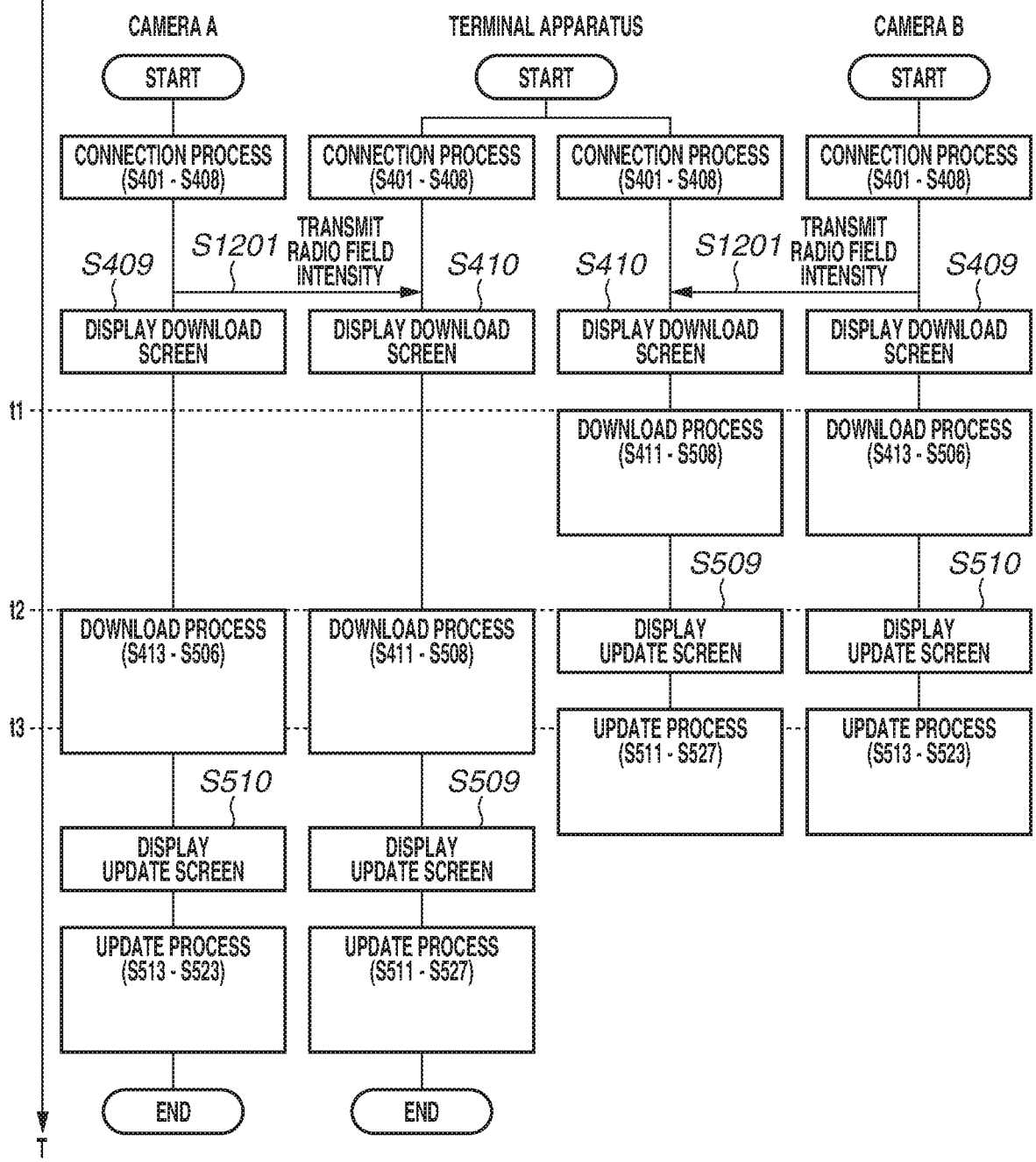
FIG. 12 is a sequence diagram illustrating an update control process according to a third exemplary embodiment.

FIG. 12 is a sequence diagram illustrating an update control process according to the third exemplary embodiment. FIG. 12 chronologically illustrates processes. With reference to FIG. 12, a description is provided taking as an example a case where the terminal apparatus 110 performs an update control process with each of two cameras 100, namely cameras A and B. The terminal apparatus 110 executes processes with the cameras A and B in parallel. As illustrated in FIG. 12, first, the terminal apparatus 110 executes connection processes with the cameras A and B in parallel. Each of these connection processes of the terminal apparatus 110 corresponds to the processes of steps S401 to S408 performed by the terminal apparatus 110 and described with reference to FIG. 4. The two connection processes are performed at the same time. Alternatively, timings of the two connection processes may vary to some degree based on internal processing time or a state of wireless communication. In response to the processes of the terminal apparatus 110, both the cameras A and B perform connection processes. Each of these connection processes of the cameras A and B corresponds to the processes of steps S401 to S408 performed by the camera 100 and described with reference to FIG. 4.

Next, in step S1201, the terminal apparatus 110 receives a radio wave condition of each of the cameras A and B. The radio wave condition is information regarding radio waves, such as radio field intensity and a communication rate. The terminal apparatus 110 compares the obtained radio wave conditions and instructs either of the cameras A and B having a better radio wave condition to download the firmware. In the present exemplary embodiment, the terminal apparatus 110 instructs the camera B to download the firmware. In this case, the terminal apparatus 110 starts a download process with the camera B. This download process of the terminal apparatus 110 corresponds to the processes of steps S411 to S508 performed by the terminal apparatus 110 and described with reference to FIGS. 4 and 5. In response to this, the camera B also starts a download process. This download process of the camera B corresponds to the processes of steps S413 to S506 described with reference to FIGS. 4 and 5. The processing of the terminal apparatus 110 and the camera 100 in and after the download processes is similar to the processing of the terminal apparatus 110 and the camera 100 described with reference to FIGS. 4 and 5.

The terminal apparatus 110 may determine a camera that performs a download process based on the order of connection to the terminal apparatus 110 or the serial numbers of the cameras 100 instead of the radio wave conditions. The terminal apparatus 110 may randomly determine a camera with which to perform a download process.

If the download process with the camera B is completed, the terminal apparatus 110 displays a firmware update screen (step S509) and performs a subsequent update process (steps S511 to S527 in FIG. 5). In response to this, the camera B displays a firmware update screen (step S510) and performs a subsequent update process (steps S513 to S523 in FIG. 5).

At a timing t2 when the terminal apparatus 110 and the camera B display the update screens, the terminal apparatus 110 starts a download process with the camera A (steps S411 to S508). In response to this, the camera A also starts a download process (steps S413 to S506). More specifically, the terminal apparatus 110 starts the download process with the camera B at a timing t1. If the download process with the camera B is completed, the terminal apparatus 110 starts the download process with the camera A at the timing t2. The timing t2 is after the timing t1. If the download process with the camera A is completed, the terminal apparatus 110 displays an update screen (step S509) and performs an update process (steps S511 to S527). In response to this, the camera A also displays an update screen (step S510) and performs an update process (steps S513 to S523).

Figure 13:
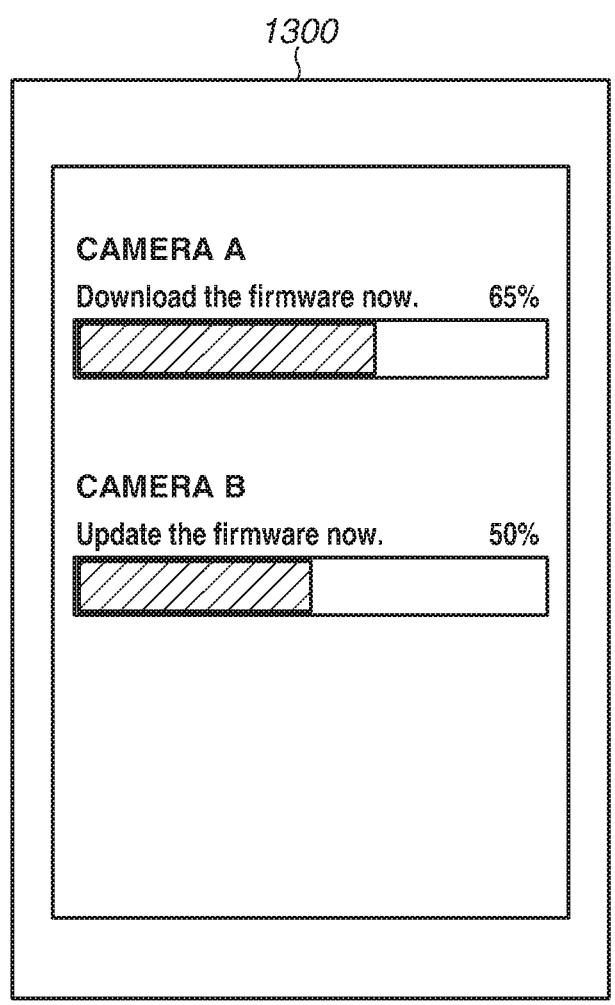
FIG. 13 is a diagram illustrating an example of a display screen displayed on a terminal apparatus.

By the above processing, at a timing t3 after the timing t2, the terminal apparatus 110 executes the update process with the camera B while executing the download process with the camera A. In this case, as illustrated in FIG. 13, the terminal apparatus 110 performs control to display a progress screen 1300, which indicates a progress status of the download process with the camera A and a progress status of the update process with the camera B. Consequently, the user can easily grasp the progress status of the process with each of the cameras. The rest of the configuration and the processing of the update system according to the third exemplary embodiment is similar to the configurations and the processing of the update systems according to the other exemplary embodiments.

As described above, in the update system according to the third exemplary embodiment, the single terminal apparatus 110 can manage the firmware of the plurality of cameras 100 in a unified manner. The plurality of cameras 100 do not simultaneously access the server apparatus 130 and download the new firmware. Thus, it is possible to prevent interference in wireless communication and lengthening of a download time.

In an update system according to a fourth exemplary embodiment, in a case where a plurality of cameras 100 download new firmware, the cameras 100 share the new firmware so that all the cameras 100 do not need to download the new firmware from the server apparatus 130. In this case, an example is described where two cameras are used. Alternatively, three or more cameras may be used.

FIG. 14 is a sequence diagram illustrating an update control process according to the fourth exemplary embodiment. First, each of the terminal apparatus 110 and the cameras A and B executes the connection process (steps S401 to S406). Then, in step S1401, the terminal apparatus 110 transmits, to the camera B, a download request to download the new firmware. The terminal apparatus 110 requests the camera A to send Wi-Fi® information to the terminal apparatus 110. In response to this request, in step S1402, the camera A transmits the Wi-Fi® information to the terminal apparatus 110 and enters a Wi-Fi® connection waiting state. The Wi-Fi® information may not be transmitted at this timing. While, in the present exemplary embodiment, the terminal apparatus 110 transmits, to the camera B, the download request to download the new firmware, a transmission destination of the download request may be the camera A. The terminal apparatus 110 may determine the transmission destination of the download request according to the Wi-Fi® radio wave condition and the like of each of the cameras.

If receiving the download request, the camera B executes a download process. This download process corresponds to the processes of steps S409 to S506 described with reference to FIGS. 4 and 5. At this time, the terminal apparatus 110 also executes a download process. This download process of the terminal apparatus 110 corresponds to the processes of steps S410 to S508 described with reference to FIGS. 4 and 5. Consequently, the camera B downloads the new firmware from the server apparatus 130. If the download is completed, in step S1403, the terminal apparatus 110 displays a transfer screen for receiving a user instruction whether to transfer the new firmware from the camera B to the camera A. Then, if it is determined that the terminal apparatus 110 has received a transfer start instruction (YES in step S1403), the processing proceeds to step S1404.

In step S1404, the terminal apparatus 110 transmits the Wi-Fi® information of the camera A to the camera B. Next, in step S1405, the cameras A and B make a Wi-Fi® connection with each other via the AP 120. Next, in step S1406, the camera B starts transferring the new firmware to the camera A. Next, in step S1407, the camera B transmits a progress status of transfer to the terminal apparatus 110. Next, in step S1408, the camera B performs control to display the progress status of the transfer. Next, in step S1409, the camera B checks whether the transfer is completed. If the transfer is not completed (NO in step S1409), the processing proceeds to step S1407. If the transfer is completed (YES in step S1409), the processing proceeds to step S1410. In step S1410, the camera B transmits, to the terminal apparatus 110, a completion notification that the transfer is completed. After the process of step S1410, the processing proceeds to step S510 (FIG. 5).

If the transfer is started in step S1406, in step S1411, the camera A transmits a progress status of the transfer to the terminal apparatus 110. The processes of steps S1412 to S1414 are similar to the processes of steps S1408 to S1410. After the process of step S1414, the processing proceeds to step S510 (FIG. 5).

If the progress status of the transfer is received in steps S1407 and S1411, in step S1415, the terminal apparatus 110 performs control to display the progress status of the transfer. Next, in step S1416, the terminal apparatus 110 checks whether the terminal apparatus 110 has received a completion notification from each of the cameras A and B. If it is determined that the terminal apparatus 110 has received the completion notification from each of the cameras A and B (YES in step S1416), the processing proceeds to step S509 (FIG. 5). If it is determined that the terminal apparatus 110 has not received the completion notification from each of the cameras A and B (NO in step S1416), the processing proceeds to step S1415. The rest of the configuration and the processing of the update system according to the fourth exemplary embodiment is similar to the configurations and the processing of the update systems according to the other exemplary embodiments.

As described above, in the update system according to the fourth exemplary embodiment, only a single camera downloads the new firmware from the server apparatus 130, and the new firmware downloaded by the single camera can be shared with other cameras.

As a modification of the fourth exemplary embodiment, after the download process of the camera B is completed, based on a user operation, for example, the camera B may not transfer the new firmware to the camera A and may perform an update process for updating the firmware of the camera B.

While the present disclosure has been described in detail based on its suitable exemplary embodiments, the present disclosure is not limited to these specific exemplary embodiments. The present disclosure also includes various forms without departing from the spirit and the scope of the disclosure. Parts of the above exemplary embodiments can be appropriately combined together.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-140122, filed Jul. 19, 2017, which is hereby incorporated by reference herein in its entirety.

What is claimed is:

1. A communication apparatus comprising:
a first wireless communication unit configured to communicate with a camera using a first wireless communication method;
a second wireless communication unit configured to communicate with the camera using a second wireless communication method;
a third wireless communication unit configured to communicate with a server apparatus using a third wireless communication method; and
a control unit,
wherein the control unit controls receipt of update information from the server apparatus via the third wireless communication unit,
wherein the control unit determines whether new firmware is present based on the update information,
wherein, in a case where the control unit determines that new firmware is present, the control unit notifies a user of the presence of the new firmware,
wherein, in a case where the control unit receives an instruction to download firmware from the user, the control unit controls the third wireless communication unit to download the new firmware from the server apparatus and displays a first progress bar indicating a progress of the download of the new firmware during the download of the new firmware,
wherein, in a case where the control unit receives an instruction to update firmware from the camera via the first wireless communication unit after the download of the new firmware is finished, the control unit transmits the downloaded new firmware to the camera via the second wireless communication unit and displays a second progress bar indicating a progress of the transmission of the new firmware during the transmission of the new firmware,
wherein power consumption of the first wireless communication unit is lower than power consumption of the second wireless communication unit,
wherein a communication area of the third wireless communication unit is longer than communication areas of the second wireless communication unit and first wireless communication unit,
wherein the download of the new firmware from the server apparatus by the third wireless communication unit is performed while the communication apparatus and the camera are paired by the first wireless communication method, wherein a connection between the communication apparatus and the camera via the second wireless communication unit is established based on information that is received from the camera via the first wireless communication unit, wherein the information includes an SSID,
wherein the connection between the communication apparatus and the camera via the second wireless communication unit is established after the download of the new firmware is finished, and
wherein the first progress bar and the second progress bar are displayed distinguishably from each other.

2. The communication apparatus according to claim 1, wherein the control unit receives a progress status of an update process using the new firmware.

3. The communication apparatus according to claim 1, wherein after communication performed by the second communication unit is disconnected, an update process is started.

4. The communication apparatus according to claim 3, wherein, after the update process is finished, the control unit stores the new firmware.

5. The communication apparatus according to claim 1, wherein the control unit controls the first communication unit to receive the firmware of the camera, and
wherein in a case where the information of the firmware of the camera and the update information received from the server apparatus via the third wireless communication unit are different, the control unit determines that new firmware is present.

6. The communication apparatus according to claim 1, wherein the first progress bar and the second progress bar are same figure in display as each other and distinguished from each other based on characters displayed on a same screen.

7. The communication apparatus according to claim 6, wherein the characters displayed to distinguish the first progress bar and the second progress bar are displayed above the first progress bar and the second progress bar.

8. The communication apparatus according to claim 1, wherein progress is displayed as a percentage together with the first progress bar and the second progress bar.

9. The communication apparatus according to claim 1, wherein the first progress bar is not displayed when the download of the new firmware is finished.

10. An information processing method executed by a communication apparatus including a first wireless communication unit configured to communicate with a camera using a first wireless communication method, a second wireless communication unit configured to communicate with the camera using a second wireless communication method and a third wireless communication unit configured to communicate with a server apparatus using a third wireless communication method, the information processing method comprising:
receiving update information from the server apparatus via the third wireless communication unit;
determining whether new firmware is present based on the update information,
notifying a user of the presence of the new firmware in a case where it is determined that new firmware is present;
controlling the third wireless communication unit to download the new firmware from the server apparatus and displaying a first progress bar indicating a progress of the download of the new firmware during the download of the new firmware in a case where an instruction to download firmware is received from the user;
transmitting, in a case where an instruction to update firmware is received from the camera via the first wireless communication unit after the download of the new firmware is finished, the downloaded new firmware to the camera via the second wireless communication unit; and
displaying a second progress bar indicating a progress of the transmission of the new firmware during the transmission of the new firmware;
wherein power consumption of the first wireless communication unit is lower than power consumption of the second wireless communication unit, wherein a communication area of the third wireless communication unit is longer than communication areas of the second wireless communication unit and first wireless communication unit,
wherein the download of the new firmware from the server apparatus by the third wireless communication unit is performed while the communication apparatus and the camera are paired by the first wireless communication method,
wherein a connection between the communication apparatus and the camera via the second wireless communication unit is established based on information that is received from the camera via the first wireless communication unit, wherein the information includes an SSID,
wherein the connection between the communication apparatus and the camera via the second wireless communication unit is established after the download of the new firmware is finished, and
wherein the first progress bar and the second progress bar are displayed distinguishably from each other.

11. The information processing method according to claim 10, further comprising: receiving a progress status of an update process using the new firmware.

12. The information processing method according to claim 10, wherein an update process is started after communication performed by the second communication unit is disconnected.

13. The information processing method according to claim 12, wherein, after the update process is finished, information of the new firmware is stored.

14. The information processing method according to claim 10, further comprising:
controlling the first wireless communication unit to receive information of the firmware of the camera, and
determining that new firmware is present in a case where the information of the firmware of the camera and the update information received from the server apparatus via the third wireless communication unit are different.

15. The information processing method according to claim 10, wherein the first progress bar and the second progress bar are same figure in display as each other and distinguished from each other based on characters displayed on a same screen.

16. The information processing method according to claim 15, wherein the characters displayed to distinguish the first progress bar and the second progress bar are displayed above the first progress bar and the second progress bar.

17. The information processing method according to claim 10, wherein progress is displayed as a percentage together with the first progress bar and the second progress bar.

18. The information processing method according to claim 10, wherein the first progress bar is not displayed when the download of the new firmware is finished.

19. A non-transitory computer-readable storage medium which stores a program for causing a communication apparatus including a first wireless communication unit configured to communicate with a camera using a first wireless communication method, a second wireless communication unit configured to communicate with the camera using a second wireless communication method, and a third wireless communication unit configured to communicate with a server apparatus using a third wireless communication method to execute a method, the method comprising:
receiving update information from the server apparatus via the third wireless communication unit,
determining whether new firmware is present based on the update information,
notifying a user of the presence of the new firmware in a case where it is determined that new firmware is present,
controlling the third wireless communication unit to download the new firmware from the server apparatus and displaying a first progress bar indicating a progress of the download of the new firmware during the download of the new firmware in a case where an instruction to download firmware is received from the user,
transmitting, in a case where an instruction to update firmware is received from the camera via the first wireless communication unit after the download of the new firmware is finished, the downloaded new firmware to the camera via the second wireless communication unit, and
displaying a second progress bar indicating a progress of the transmission of the new firmware during the transmission of the new firmware,
wherein power consumption of the first wireless communication unit is lower than power consumption of the second wireless communication unit,
wherein a communication area of the third wireless communication unit is longer than communication areas of the second wireless communication unit and first wireless communication unit,
wherein the download of the new firmware from the server apparatus by the third wireless communication unit is performed while the communication apparatus and the camera are paired by the first wireless communication method,
wherein a connection between the communication apparatus and the camera via the second wireless communication unit is established based on information that is received from the camera via the first wireless communication unit, wherein the information includes an SSID,
wherein the connection between the communication apparatus and the camera via the second wireless communication unit is established after the download of the new firmware is finished, and
wherein the first progress bar and the second progress bar are displayed distinguishably from each other.

20. A mobile terminal comprising:
a first wireless communication unit configured to communicate with a camera using a Bluetooth Low Energy (BLE);
a second wireless communication unit configured to communicate with the camera using a Wi-Fi;
a third wireless communication unit configured to communicate with a server using a public telephone network; and
a control unit,
wherein, if the mobile terminal and the camera are paired using BLE, the control unit controls receipt of update information of the Bluetooth paired camera from the server apparatus via the public telephone network,
wherein the control unit determines whether new firmware is present based on the update information,
wherein, in a case where the control unit determines that new firmware is present, the control unit notifies a user of the presence of the new firmware,
wherein, in a case where the control unit receives an instruction to download firmware from the notified user while the mobile terminal and the camera are paired using BLE and are not connected using Wi-Fi, the control unit controls the third wireless communication unit to download the new firmware from the server apparatus and displays a first progress bar indicating a progress of the download of the new firmware during the download of the new firmware, wherein, in a case where the control unit receives an instruction to update firmware from the camera via the BLE after the download of the new firmware is finished, the control unit transmits the downloaded new firmware to the camera via the Wi-Fi and displays a second progress bar indicating a progress of the transmission of the new firmware during the transmission of the new firmware, wherein the connection between the communication apparatus and the camera via the second wireless communication unit is established after the download of the new firmware is finished, and wherein a connection between the communication apparatus and the camera via the Wi-Fi is established based on an SSID that is received from the camera via the BLE, and wherein the first progress bar and the second progress bar are displayed distinguishably from each other.

21. The communication apparatus according to claim 20, wherein after communication performed by the second communication unit is disconnected, an update process is started.

22. The communication apparatus according to claim 20, wherein the first progress bar and the second progress bar are same figure in display as each other and distinguished from each other based on characters displayed on a same screen.

23. The communication apparatus according to claim 20, wherein progress is displayed as a percentage together with the first progress bar and the second progress bar.

24. The information processing method according to claim 20, wherein the first progress bar and the second progress bar are same figure in display as each other and distinguished from each other based on characters displayed on a same screen.

25. The communication apparatus according to claim 24, wherein the characters displayed to distinguish the first progress bar and the second progress bar are displayed above the first progress bar and the second progress bar.

26. The communication apparatus according to claim 20, wherein the first progress bar is not displayed when the download of the new firmware is finished.

* * * * *